United States Patent [19]

D'Aoust et al.

[11] Patent Number: 5,048,104
[45] Date of Patent: Sep. 10, 1991

[54] METHOD AND APPARATUS FOR TRANSPOSING IMAGE DATA

[75] Inventors: Robert D'Aoust, Detroit; Debora Y. Grosse, Ann Arbor; Stephen R. Krebs, Ypsilanti Township, Washtenau County, all of Mich.

[73] Assignee: Unisys Corporation, Blue Bell, Pa.

[21] Appl. No.: 419,778

[22] Filed: Oct. 10, 1989

[51] Int. Cl.$^5$ .............................................. G06K 9/36
[52] U.S. Cl. ..................................... 382/46; 358/443; 382/44
[58] Field of Search .................... 382/46, 44; 340/727; 358/452, 443

[56] References Cited

U.S. PATENT DOCUMENTS

| | | | |
|---|---|---|---|
| 3,652,791 | 3/1972 | Shuey | 178/7.1 R |
| 4,052,699 | 10/1977 | Micka et al. | 382/46 |
| 4,087,788 | 5/1978 | Johannesson | 382/22 |
| 4,091,424 | 5/1978 | Widergren | 358/260 |
| 4,168,488 | 9/1979 | Evans | 382/46 |
| 4,363,036 | 12/1982 | Subramaniam | 358/261 |
| 4,399,467 | 8/1983 | Subramaniam | 358/261 |
| 4,410,965 | 10/1983 | Moore | 365/230 |
| 4,412,252 | 10/1983 | Moore et al. | 358/160 |
| 4,510,618 | 4/1985 | Ataman et al. | 382/54 |
| 4,510,617 | 4/1985 | LeBrun et al. | 382/57 |
| 4,613,986 | 9/1986 | Ataman et al. | 382/54 |
| 4,672,186 | 6/1987 | Van Tyne | 235/470 |
| 4,736,442 | 4/1988 | Kornfeld | 382/46 |

OTHER PUBLICATIONS

Some Extensions of the Ordering Techniques for Compression of Two-Level Facsimile Pictures, F. W. Mounts, A. N. Netravali & K. A. Walsh 1978 AT&T Company The Bell System Technical Journal pp. 3057–3067.

Twodimensional Facsimile Source Encoding Based on a Markov Model by Dieter Preus 1975, NTZ-Aufsatze pp. 358–363.

Ordering Techniques for Coding of Two-Tone Facsimile Pictures by A. N. Netravali, F. W. Muonts & E. G. Bowen 1976 AT&T Company-The Bell System Technical Journal pp. 1539–1553.

Primary Examiner—Leo H. Boudreau
Attorney, Agent, or Firm—Harness, Dickey & Pierce

[57] ABSTRACT

A method and apparatus for the transposition of obtained video image data. This video image data originally comprises a plurality of columns, containing a plurality of pixels therein. Each of these columns uniquely corresponds to a vertical segment of the document being scanned. These vertical columns of data are then placed into an external memory and outputted therefrom, by a transposer controller, which causes the output to comprise pixel data contained in the rows of the original vertical columns input thereto.

13 Claims, 15 Drawing Sheets

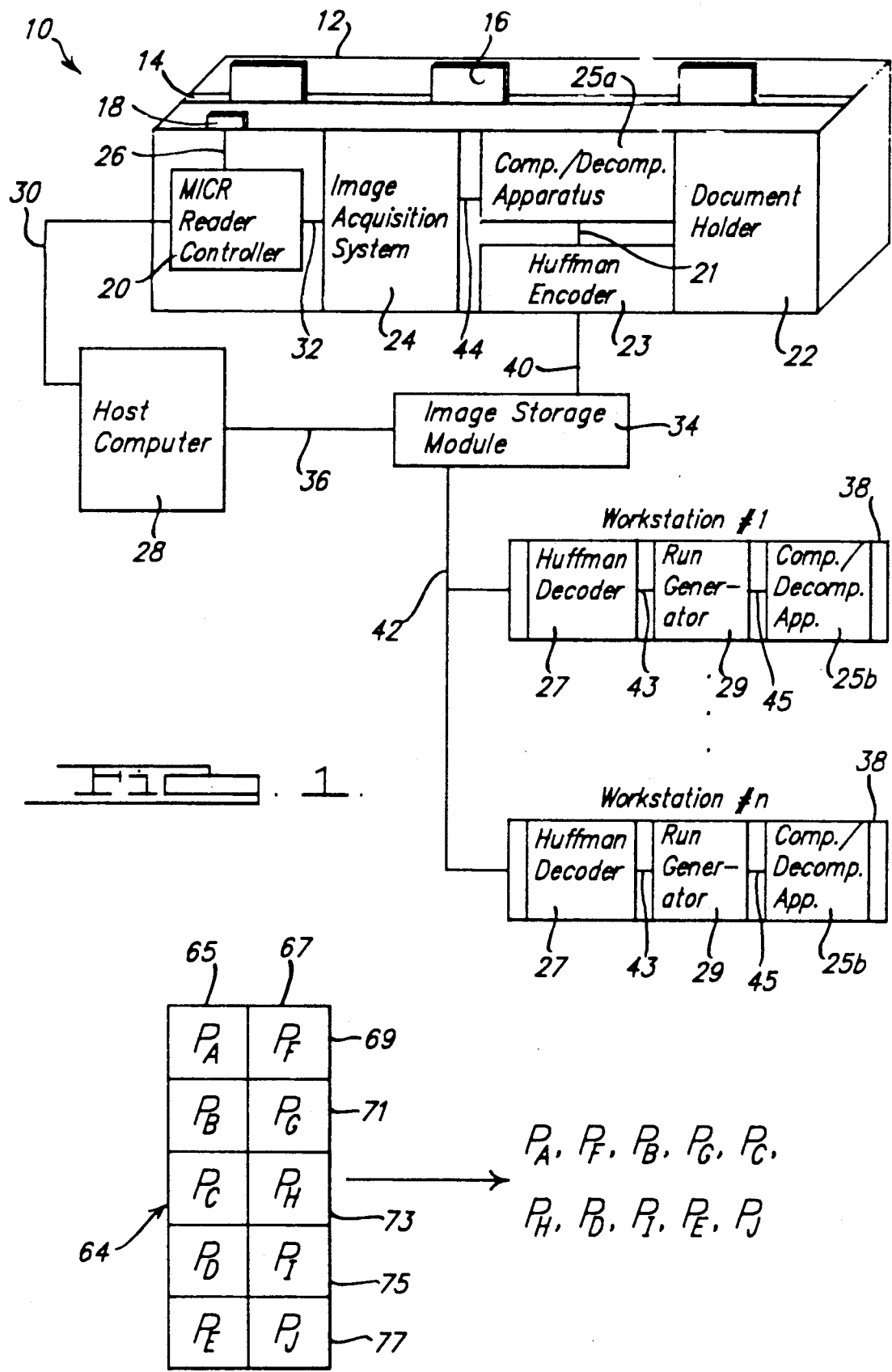

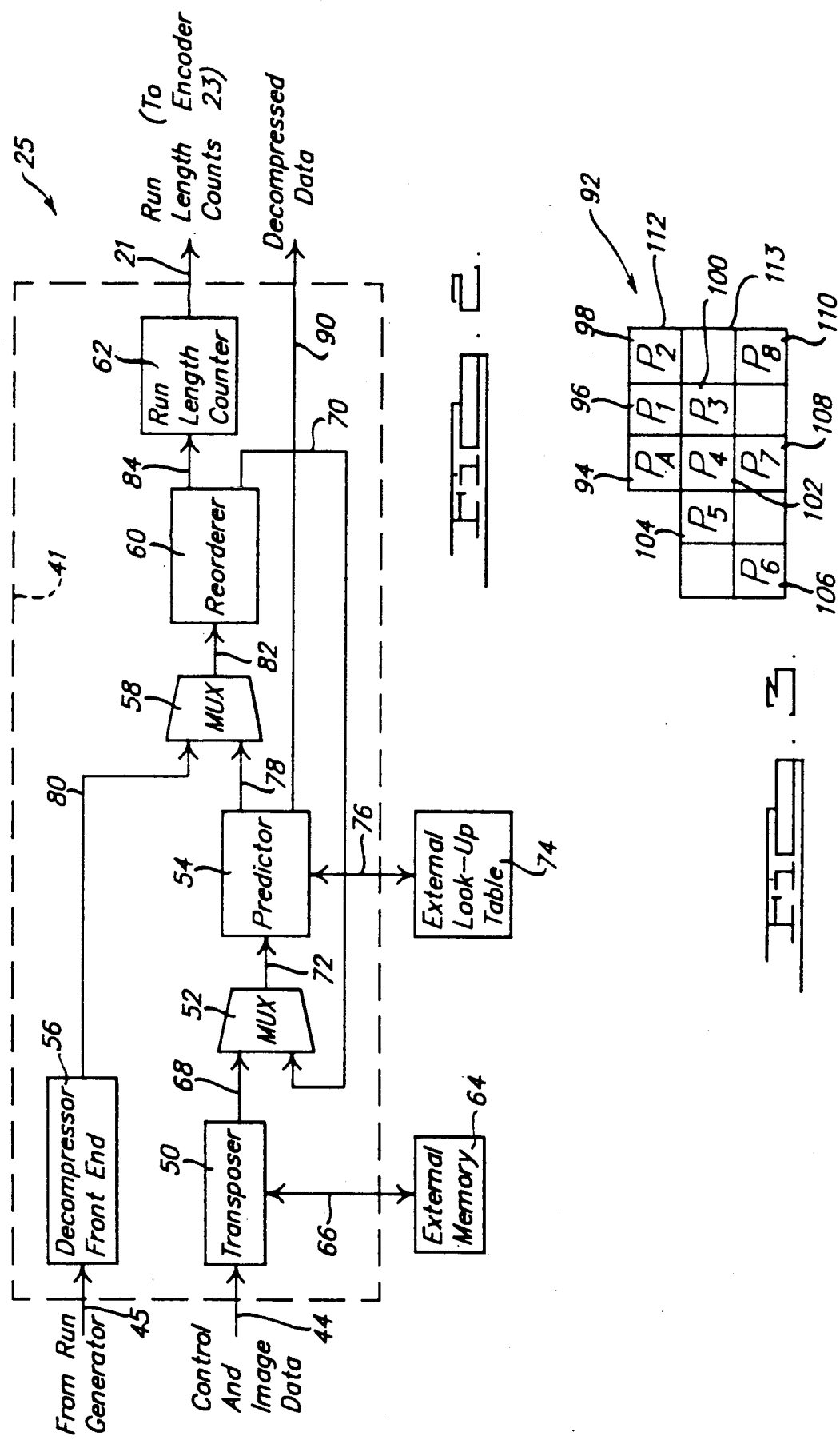

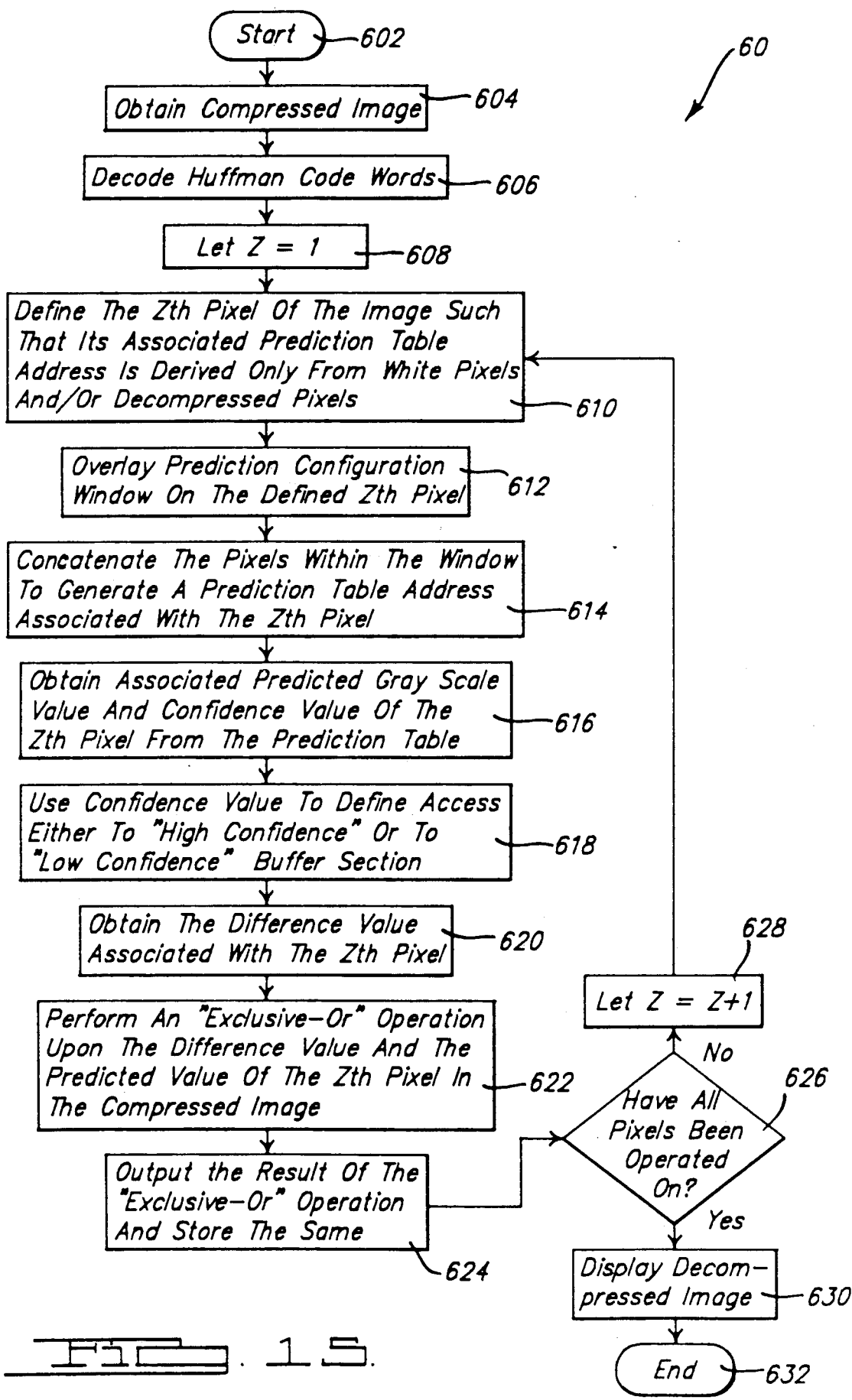

METHOD AND APPARATUS FOR TRANSPOSING IMAGE DATA

CROSS REFERENCE TO RELATED APPLICATIONS

This application is related to the following applications, which were filed of even date herewith and are assigned to the same assignee in this application:

PARALLEL PIPELINED IMAGE PROCESSOR—Capo et al. application Ser. No. 07/419,528, filed Oct. 10, 1989;

IMAGE DATA PROCESSOR—Klein et al. application Ser. No. 07/419,270, filed Oct. 10, 1989;

METHOD AND APPARATUS FOR EFFECTING BACKGROUND SUPPRESSION OF IMAGE DATA—Klein et al. application Ser. No. 07/419,594, filed Oct. 10, 1989;

METHOD AND APPARATUS FOR EFFECTING SPOT/VOID FILTERING OF IMAGE DATA—Klein et al. application Ser. No. 07/419,595, filed Oct. 10, 1989;

METHOD AND APPARATUS FOR SCALING IMAGE DATA—Klein et al. application Ser. No. 07/420,779, filed Oct. 10, 1989;

METHOD AND APPARATUS FOR DETECTING DOCUMENT SIZE IN AN IMAGING SYSTEM—D'Aoust et al. application Ser. No. 07/419,530, filed Oct. 10, 1989;

APPARATUS FOR IMAGE DATA TRANSPOSITION AND COMPRESSION/DECOMPRESSION—Klein et al. application Ser. No. 07/419,253, filed Oct. 10, 1989;

METHOD AND APPARATUS FOR LOSSLESS COMPRESSION AND DECOMPRESSION OF IMAGE DATA—Klein et al. application Ser. No. 07/419,611, filed Oct. 10, 1989;

DIAGNOSTIC SYSTEM FOR A PARALLEL PIPELINED IMAGE PROCESSING SYSTEM—D'Aoust et al. application Ser. No. 07/419,606, filed Oct. 10, 1989.

BACKGROUND OF THE INVENTION

1. Field of the Invention

This invention relates to the compression and decompression of data, and more particularly to a method and apparatus for the compression and decompression of video data associated with a video imaging system.

2. Discussion

Financial documents, such as checks or drafts, usually contain a magnetic ink character recognition (MICR) codeline which is typically read by a sorter which automatically sorts these documents into a plurality of bins. Prior to this encoding, in current practice, these documents are physically handled by a plurality of individuals, each of whom enters the dollar amount associated therewith upon each of the documents by the use of specialized amount entry equipment. Additionally, these individuals physically correct errors associated with the reading of the magnetic codeline by entering the correct code upon the document by this amount entry equipment.

These prior techniques of utilizing a plurality of individuals to process financial documents, in the aforementioned manner has proved to be relatively costly and inefficient in that many of these documents have been lost or destroyed during their physical handling, and the speed associated with the processing of the documents is limited to that associated with the processing capabilities of the individuals and the mechanical amount entry equipment used thereby.

SUMMARY OF THE INVENTION

In accordance with the present invention, a transposer is provided for the transposition of obtained vertical column segments of image data into an output sequence of rows associated therewith. This outputting of rows of data has been found to greatly increase the efficiency of the compression process. The vertical column data is initially input to a pixel packer which, under the direction of a transposer controller, places the data in vertical columns to a memory. The transposer controller then causes, by the issuance of write commands to the memory, the rows of each of the columns to be output therefrom.

These and other aspects, features, and advantages of this invention will be more readily understood by reviewing carefully the following detailed description taken in conjunction with the accompanying drawings and claims.

BRIEF DESCRIPTION OF THE DRAWINGS

For a more complete understanding of the present invention, relative to the advantages thereof, reference may be made to the following detailed description taken in conjunction with the accompanying drawings in which:

FIG. 1 is a block diagram of a typical financial document sorting system containing the compression/decompression apparatus of this invention;

FIG. 2 is a block diagram of the compression/decompression apparatus shown generally in FIG. 1;

FIG. 3 is an illustration of the prediction window, shown generally in FIG. 2;

FIG. 6 is a block diagram of the predictor shown generally in FIG. 2;

FIG. 15 is a flowchart illustrating the decompression operation associated with the preferred embodiment of this invention which is shown generally in FIG. 2.

DESCRIPTION OF THE PREFERRED EMBODIMENT

Figure 4:
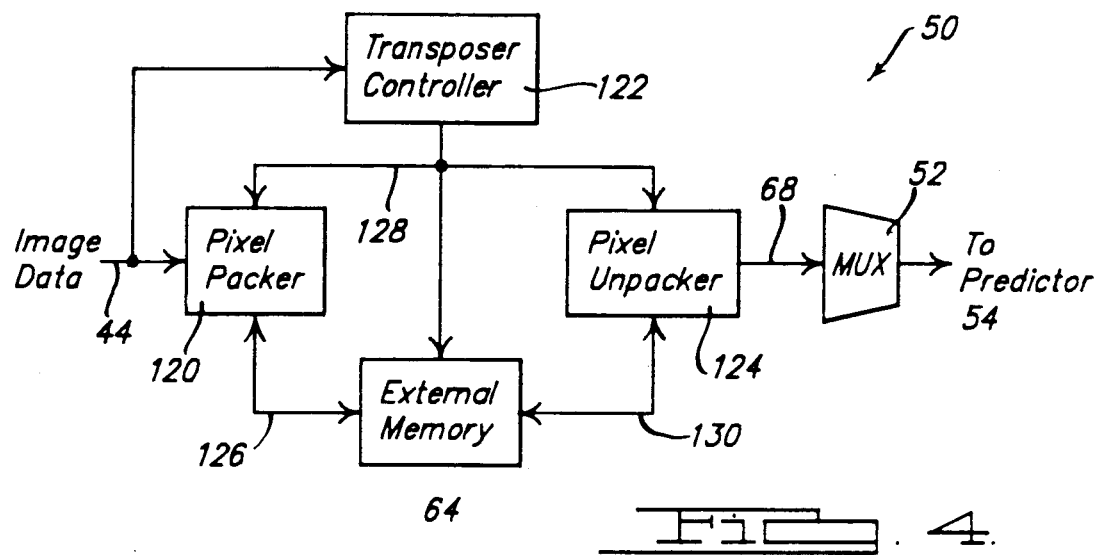
FIG. 4 is a block diagram of the transposer, shown generally in FIG. 2.

Referring now to FIG. 1, there is shown a financial document sorting system 10 having a typical document sorter 12, which in the preferred embodiment of this invention, comprises a model DP1800 sorter which is manufactured by the UNISYS Corporation of Blue Bell, Pa. Sorter 12 contains a track 14 into which a plurality of financial documents 16 traverse through and reside within, and further contains a magnetic ink character recognition (MICR) codeline reader 18 and a MICR reader controller 20. Additionally, sorter 12 contains a document holder 22, an image acquisition system 24 (i.e., comprising a plurality of cameras and associated image processing entities), a compression/-decompression apparatus 25(a) (used in this position as a data compressor) arranged in accordance with the teachings of the preferred embodiment of this invention, and a typical Huffman encoder 23. System 10 further contains a host computer 28, which controls the general operation of sorter 12, an image storage module 34, and a plurality of workstations 38, each containing the compression/decompression apparatus 25b, a Huffman decoder 27, and a run generator 29.

Controller 20 is coupled to the reader 18 by signals on bus 26, to host computer 28 by signals on bus 30, and to the image acquisition apparatus 24 by signals on bus 32. The compression/decompression apparatus 25a, within sorter 12, is coupled to the image acquisition system 24 by signals on bus 44 and to the Huffman encoder 23 by signals on bus 21. The image storage module 34 is coupled to the Huffman encoder 23 by signals on bus 40, the host computer 28 by signals on bus 36, and to the Huffman decoder 27, within each of the workstations 38 by signals on bus 42. Each decoder 27, is coupled to an associated run generator 29 by signals on bus 43, while each run generator 29 is coupled to an associated apparatus 25(b) by signals on bus 45.

It should be noted the apparatus 25(a) is substantially equivalent to apparatus 25(b) and that apparatus 25(a) and apparatus 25(b) may both be used for compression or for decompression. The selection of this function is by means of a jump selector. It should further be noted that Huffman encoding is typically used to compress image data and is well known to practitioners in the art. For a description of Huffman encoding the reader is directed to pages 528-531 of "An Introduction to Statistical Communication Theory" (1969) authored by John B. Thomas and published by John Wiley and Sons, Inc.

In operation, documents 16 sequentially traverse by reader 18 which reads a typical magnetic code appearing upon the magnetic MICR codeline which is normally placed upon each of the documents 16. This code is then sent to the computer 28, by signals on bus 30, for storage therein and to image acquisition system 24.

As each of the documents 16 further travel within the track 14, they pass in close proximity to system 24 which acquires an image of them, preferably using a plurality of replicated image capture channels. This image is then processed by a plurality of image processing operations (performed within system 24) and these operations typically produce a final processed digital image having a plurality of pixels therein, each pixel being represented by approximately two bits of data. This digitized image is then sent to apparatus 25(a) by signals on bus 44. Apparatus 25(a) then compresses the received digitized image and subsequently sends the compressed image to the encoder 23 by signals on bus 21. Encoder 23 then encodes the compressed data and sends it to the image storage module 34 by signals on bus 40. After passing system 24, each of the documents 16 are then sorted and held within the document holder 22.

After a typical block of the documents 16 have been sorted in the aforementioned manner, the workstations 38, by signals on the bus 42, sequentially request the aforementioned stored document images from the storage module 34. These encoded and compressed images are then downloaded to the workstations 38, by use of signals on the bus 42, along with their associated magnetic code data originally obtained from host computer 28. Within each workstation 38, the encoded and compressed images are decoded by decoder 27 and the decoded image is sent to generator 29 by signals on bus 43. Generator 29 then transmits a binary coded run length for each decoded Huffman value to the apparatus 25(b) (used at this location as a data decompressor) by signals on bus 45. Apparatus 25(b) then receives the binary coded run lengths and decompresses the decoded image therefrom for display to the operator of workstations 38.

After these images are displayed by the workstations 38, individual operators electronically enter the viewed dollar amount associated with each document and electronically resolve any difficulties associated with the reading by reader 18, of the MICR codeline thereon. Each image's dollar amount, and its associated corrections then form a single computerized record which is then sent to the storage module 34, by use of signals on the bus 42, where it may be later accessed for use in automatically placing the dollar amount and corrections upon the sorted documents.

The aforementioned document sorting system 10, therefore, substantially eliminates the physical handling of the plurality of documents 16 which had previously been involved with the placement of the associated dollar amount thereon, thereby increasing the efficiency and timeliness of the overall document sorting system 10.

Referring now to FIG. 2, there is shown the compression and decompression apparatus 25(a) or 25(b) (designated as 25 in FIG. 2) arranged in accordance with the principles of this invention, and including a transposer 50, a multiplexer 52, a predictor 54, a decompressor front end 56, a multiplexer 58, a reorderer 60 and a run length counter 62. Entities 50, 52, 54, 56, 58, 60 and 62, in the preferred embodiment of this invention, comprise a single application specific integrated circuit (ASIC), whose components are shown within the dashed line 41 of FIG. 2.

Transposer 50 is coupled to memory 64 by signals on bus 66 and is further coupled to the multiplexer 52 by signals on bus 68 while concurrently receiving acquired image data and control data upon signal on bus 44. In this embodiment, memory 64 is located on a motherboard mounting the ASIC, but is external to the ASIC. Multiplexer 52 has its other input coupled to a first output of the reorderer 60 by signals on bus 70 and has an output signal on bus 72 which is coupled to the input of the predictor 54. The input of predictor 54 is further coupled to an externally placed lookup table 74 by signals on bus 76 and has an associated output signal on bus 78 which is coupled to a first input of the multiplexer 58.

The multiplexer 58, has a second input coupled to the decompressor front end 56 by bus 80 and has its output coupled to the reorderer 60 by bus 82. Reorderer 60 has one of its outputs coupled to the run length counter 62 by bus 84. Lastly, the decompressor front end 56 has its input coupled to a run length generator 29 by signals on bus 45. The output of counter 62, represented by signals on bus 21, will typically be coupled to the Huffman encoder 23 by signals on bus 21 and the predictor 54 further has an output signal on bus 90 which is the decompressed data associated with the data on bus 45.

Generally, in compression operation of unit 25, the image data to be compressed, which is represented by signals on bus 44, is input into the transposer 50 and is then placed thereby into the external memory 64 by signals on bus 66. Thereafter, control signals on bus 44 are input into the transposer 50 to direct transposer 50 to strip off undesired rows of pixels that may be present within an image due to channel overscan operations which are used to reduce processing errors by adding data to the top and the bottom of each of the acquired image channels. Additionally, control signals on bus 44 cause transposer 50 to re-order the pixels of the acquired image (which are input thereto as vertical pixel scanned image lines) into horizontal pixel scan lines. This is done, since it has been shown that subsequent compression in a horizontal manner results, in one embodiment, in an approximate 2.5% improvement in prediction efficiency over that associated with the vertical pixel scan line compression.

That is, it has been found that the discontinuity at the beginning and end of each line (i.e., either horizontal or vertical) of pixel image data is approximately 2 pixels wide. It has further been found that, for typical financial documents each of the acquired images, in one embodiment, is approximately 825 pixels long (i.e., in a horizontal direction) and approximately 88 pixels high (i.e., in a vertical direction). Assuming that one predicts in the vertical direction, there will be $(4 \times 825)$ or a total of approximately 3,300 imprecisely predicted pixels. If, however, the prediction precedes horizontally, there will only be $(4 \times 88)$ or approximately 352 imprecisely predicted pixels. Since it is known that there are approximately 72,600 total pixels within an acquired image, the difference between 352 and 3,300 has been found empirically to represent an approximate 2.5% improvement in prediction accuracy relative to the compression of horizontal pixel image data as opposed to the compression of vertical pixel image data.

Additionally, compression of data along a horizontal row allows run lengths to have a maximum value which may be defined to be up to the overall length of the row. This is substantially longer than the maximum value of the run lengths associated with the pixel columns of the acquired image, thereby allowing for greater efficiency in the typical Huffman encoding techniques used upon the run lengths associated with signals on bus 21, by encoder 23 (FIG. 1).

Once the acquired image data has been transposed and filtered by transposer 50 (in the general manner previously specified), transposer 50 then sends this transposed image data from memory 64 to the multiplexer 52 by signals on bus 68. The multiplexer 52 then outputs the same image data into the predictor 54 by the signals on bus 72. The predictor 54 then reversibly remaps pixel values represented by the signals on bus 72 in order to improve compressibility associated therewith. That is, the predictor 54 chooses the most probable gray-scale value for each pixel of the received image based upon the gray-scale level of its neighboring pixels and finds the difference value between the aforementioned predicted gray-scale value and the actual pixel gray-scale value. The predictor 54 then substitutes this difference value for the actual pixel gray-scale value thereby outputting the same to the reorderer 60 by the use of multiplexer 58 and signals on the bus 82.

Specifically, the predictor 54 performs this task by passing a prediction window over the transposed gray-scale image of pixels represented by signals on the bus 72 and then outputs the bits in the window to a lookup table 74 (mounted externally of the ASIC) 41 by signals on bus 76. The external lookup table contains a previously derived prediction state table (to be later explained) and upon receipt of the bits on the bus 76, sends back (along the same bus 76) to the predictor 54 the resultant predicted gray-scale value and confidence value associated therewith. This predicted gray-scale value and confidence value are associated with a single pixel in the window, which is termed the "active pixel". Each pixel in the acquired image is predicted in the aforementioned manner by being defined as the "active pixel" at some point in the image prediction process. This confidence value is also sent to the reorderer 60 by the cooperation of buses 76, 78, and 82.

The window 92 used by the predictor 54 is shown generally in FIG. 3 as containing the active pixel ("P$_A$") denoted as 94 which is to be predicted and further contains image pixels 96, 98, 100, 102, 104, 106, 108 and 110. Image pixels 96, 98, 100, 102, 104, 106, 108, and 110 are used to predict the gray-scale value of the active pixel 94 by the usual concatenation thereof. The prediction window 92 is configured in the present form such that it is unbiased in any of the associated prediction directions, since the window 92 has the same number of window pixels 96, 98, 100, 102, 104, 106, 108, and 110 in the vertical, horizontal, or diagonal direction relative to the active pixel 94. Further, each pixel 96, 98, 100, 102, 104, 106, 108, and 110 is comprised, in one embodiment, of two bits of gray-scale data and the window 92 is made to fill in values having a gray-scale level of "white" if the physical location of the active pixel 94 prevents all of the pixels 96, 98, 100, 102, 104, 106, 108, and 110 from being defined within the acquired image (i.e., pixel 94 is one of the edge pixels of the acquired image). This is particularly useful in the decompression of the data since the use of the gray-scale level of "white", as a "filler" value, represents a known starting condition. This is especially true at the beginning of each of the lines 112 of the acquired image. Because the compressed image must be able to be decompressed, the prediction window 92 contains only pixels 96, 98, 100, 102, 104, 106, 108, and 110 physically preceding in the prediction process, within the acquired image, the pixel 94 currently being predicted. Therefore, pixel 94 is predicted based upon known (i.e., previously processed) pixel 96, 98, 100, 102, 104, 106, 108, and 110 values and may be "depredicted" (for decompression purposes) from these known pixel 96, 98, 100, 102, 104, 106, 108, and 110 values as well.

The reorderer 60, upon receiving the predicted difference values and associated confidence values, which are represented by signals on bus 82, increases the probability of long type runs and hence compressibility, by gathering together prediction difference values likely to be zero. Reorderer 60 arranges each row of prediction difference values by moving prediction difference values having a high confidence value to one end of a buffer and prediction difference values having a low confidence value to the other end of the buffer contained therein. This reordering of prediction difference values, when combined with the definition of runs as being generally a plurality of zeros between each pair of ones (or alternatively the number of zeros preceded by a one), increases the length of the runs and thusly increases the efficiency of the compressibility of the image data. This reordering of prediction difference values is then input to the run length counter 62, by means of signals on bus 84, and counter 62 which then computes run lengths and then outputs an associated run length count on bus 21 to the Huffman encoder 23. That is, since these zeros represent a null prediction difference, they will greatly outnumber the occurrences of the "ones" (inaccurate prediction) if the prediction associated with predictor 54 is consistently accurate. Therefore, by placing the most frequently occurring prediction difference value types (i.e., zeros) together and allowing runs to be defined by the sequential number thereof, it has been found that longer type runs have been created.

Referring now to FIG. 4, there are shown details of the transposer 50 of FIG. 2 as containing a pixel packer 120, a transposer controller 122, and a pixel unpacker 124. Specifically, the acquired image data, represented by signals on bus 44, is input into pixel packer 120. Pixel packer 120 is further coupled to memory 64 (which is mounted external to the ASIC) by bus 126 and to the transposer controller 122 by bus 128. The pixel unpacker 124 is coupled to the external memory 64 by bus 130 and is coupled at an input thereof to the transposer controller 122 by bus 128. Pixel unpacker 124 further has an output represented by signals on bus 68 which is input into multiplexer 52.

In operation, the acquired image data represented by the signals on the bus 44 is input into the pixel packer 120 which, in one embodiment, contains typical memory storage for one pixel having two data bits associated therewith and also contains a typical memory read and write controller coupled thereto. When a first pixel enters packer 120, by bus 44, packer 120 stores the same therein. When a second, and subsequent, pixel enters packer 120, both it and the stored first pixel are output to the external memory 64 by bus 126. This continues until all the acquired image data upon bus 44 has been packed and sent to memory 64. At this time, the memory 64 contains the data associated with the image in substantially the same arrangement as it was received by the packer 120 (i.e. in vertical image scanned segments).

External memory 64, in one embodiment, comprises a typical "first in first out" (FIFO) memory and a typical random access memory (RAM) coupled thereto. Data received on bus 126, from packer 120, comprising the first vertical column of an acquired image are temporarily stored in the FIFO. When the first two pixels associated with the second column of the image are output by pixel packer 120 onto bus 126, the first two pixels from the first column of image data are pushed out of the FIFO and these four pixels (8 bits) are then sent to the random access memory and stored in memory locations specified by the transposer controller 122 and which are transmitted to the random access memory, of memory 64, by signals on bus 128. Controller 122, by signals on bus 128, further enables the random access memory, of memory 64, to receive and transmit data as well.

The pixel unpacker 124 comprises a typical eight bit data register (in one embodiment) which is used to store a byte of data which is read from the RAM of memory 64. Pixels contained within the register of unpacker 124 are then selected by the transposer controller 122, by bus 128, to be placed on bus 68 and then to the multiplexer 52. These pixels are first placed within the register of unpacker 124 by the directive of controller 122. That is, controller 122 issues a read command by signals on bus 128 to the random access memory of memory 64 at an address whose contents are to be output. Memory 64 then places the contents at the defined address to the register of the unpacker 124 by bus 130 and this data is temporarily store therein until it is output to multiplexer 52.

Controller 122, defines the data to be output to unpacker 124 as being contained in memory locations of the random access memory which correspond to horizontal "slices" of the image. That is, the stored image data is read such that pixels are output in a pattern corresponding to horizontal scans of all of the vertical columns of contained data. In one embodiment, this is done by the controller 122 counting the numbers of rows in the stored data within the memory 64 and then sequentially requesting these rows to be output therefrom.

Figure 5:
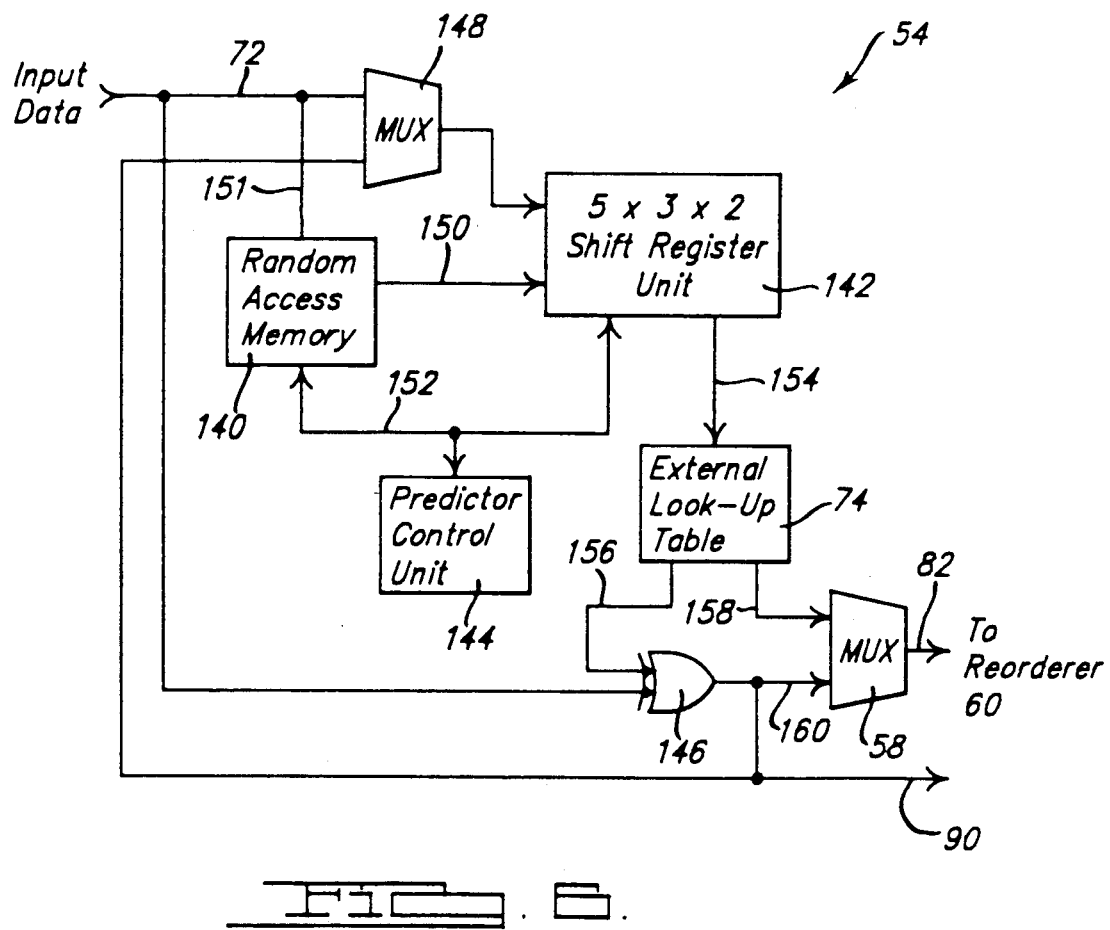
FIG. 5 is an illustration of the use of transposer, shown generally in FIG. 4.

To illustrate the transposition process, reference is now made to FIG. 5 in which is shown the external memory 64 as initially containing pixels "$P_A$", "$P_B$", "$P_C$", "$P_D$", "$P_E$", "$P_F$", "$P_G$", "$P_H$", "$P_I$", and "$P_J$" associated with vertical scans 65 and 67 of image data and placed therein by packer 120 through bus 126.

Specifically, pixels "$P_A$", "$P_B$", "$P_C$", "$P_D$", and "$P_E$" are associated with scan column 65 while pixels "$P_F$", "$P_G$", "$P_H$", "$P_I$", and "$P_J$" are associated with scan column 67.

In the aforementioned transposition process, the transposer controller directs memory 64 to output pixels in the following sequence: "$P_A$", "$P_F$", "$P_B$", "$P_G$", "$P_C$", "$P_H$", "$P_D$", "$P_I$", "$P_E$", and "$P_J$" thereby outputting pixels within rows 69, 71, 73, 75, and 77, respectively, and which are horizontal pixel "slices" of the acquired image.

Additionally, controller 122 contains an overscan counter which enables the pixel packer 120, by signals on bus 128, to begin the aforementioned operation on a vertical column 65, 67 of image data only when the number of acquired image pixels, equal to the contents of the overscan counter, have initially appeared upon bus 44. This a)lows the apparatus 10 to ignore "extra" rows of pixels which were added to the beginning of every column 65, 67 by acquisition system 24 as overscan. This filtering out of overscan pixels allows the subsequent compression of the image data to be more efficient. Additionally, it should be noted that since packer 120 outputs data to memory 64 after every other pixel upon bus 126 and since unpacker 124 only needs to read from memory 64 once for every two pixels, both the reading and writing to and from the memory 64 occur concurrently, in the preferred embodiment of this invention. This concurrency of operation keeps the data processing throughput substantially high.

These obtained horizontal rows 69, 71, 73, 75 and 77 of pixels are then output from pixel unpacker 124, by signals on the bus 68, to multiplexer 52. It should be noted that multiplexers 52 and 58 are typically jump connected such that they allow a predefined input signal (i.e. either input signals on buses 68 and 78 (FIG. 2); or input signals on buses 70 and 80) to be respectively output therefrom. Thus, this transposed pixel data represented by signals on the bus 68 after being input to multiplexer 52 are subsequently output therefrom as signals on bus 72 to predictor 54 (FIG. 2).

Referring now to FIG. 6, there are shown details of the predictor 54 of FIG. 2 as containing a random access memory 140, a 5×3×2 bit shift register unit 142, a predictor control unit 144, an Exclusive-OR gate 146, and a multiplexer 58.

Memory 140 is coupled, by bus 150, to assembly 142 and by bus 152 to predictor control 144. Bus 152 further couples assembly 142 to predictor control 144. Lookup table 74 is coupled to assembly 142 by bus 154, to an input of the Exclusive-OR gate 146 by bus 156, and to the input of multiplexer 58 by bus 158.

The Exclusive-OR gate 146 has its output coupled to multiplexer 58 and to multiplexer 148 by bus 160 and has another of its inputs coupled to bus 72 (FIG. 2). Bus 72 is also coupled to multiplexer 148.

In operation, random access memory 140 is made to be an extension of shift register assembly 142 by bus 150. Pixel image data from bus 72 is initially stored in row 112 of window 92 (FIG. 3) and is also stored in memory 140 through bus 151. After a time delay, the contents of memory 140 are sequentially placed in the second row 113 of the window 92 (FIG. 3) which is contained in unit 142 and shifted through unit 142. This shifting then generates a plurality of prediction table addresses which are placed upon bus 154 to table 74 (which is external to the ASIC). A 5×3×2 bit shift register unit, in one embodiment, is used since each pixel 94, 96, 98, 100, 102, 104, 106, 108, and 110 (FIG. 3), in this embodiment, contains only two bits of data and because the window 92 is defined in the configuration as shown in FIG. 3 as capable of being stored as a 5×3 pixel matrix.

These prediction table addresses are received by the external lookup table 74 which causes a previously stored predicted gray-scale value associated with the active pixel 94 to be output on to the bus 156 to the Exclusive-OR gate 146 and further causes an associated confidence bit value to further be output therefrom and represented by signals on bus 158.

The input data associated with signals on bus 72 is further coupled to the Exclusive-OR gate 146 such that the input data is logically combined with its predicted value on bus 156 thus causing gate 146 to output a prediction difference value on bus 160. This prediction difference value is input along with its associated confidence bit value on bus 158 to multiplexer 58 and subsequently to reorderer 60 (FIG. 2) by signals on bus 82.

When the ASIC and associated external elements of FIG. 2 are being used for decompression purposes, the input data on bus 72 represents predicted differences generated in compression. Performance of an Exclusive-OR operation upon the predicted difference associated with signals on bus 72 and the predicted value on bus 156 produces an output on bus 160 which recreates a pixel from the original image and thus may be used for decompression. Multiplexer 148 allows the input data upon bus 72 to enter the shift register unit 142 and memory 140 in order to allow prediction differences to be generated, onto bus 160, in the aforementioned manner for compression and also, alternatively, allows the placement of the recreated pixel (used in decompression), which is on bus 160, into unit 142 such that it may be used by window 92 (FIG. 3) in order to predict the next pixel by using it to address the table 74 (by bus 154) and to produce a prediction upon bus 156 to gate 146 thereby recreating another pixel in the manner set forth above. Bus 160 is further coupled to bus 90 and allows the decompressed pixel to be output from predictor 54 in the arrangement shown in FIG. 2.

Deprediction is therefore performed based upon the values of the previously depredicted pixels in shift register unit 142 in a recursive fashion. Therefore, if an error occurred during the transmission of the compressed image to predictor 54, every pixel following the location of the error would be corrupted. Predictor control unit 144 therefore creates prediction groups in order to limit this damage during the compression of the acquired image on bus 72. Additionally, the first pixel, in decompression, is decompressed based upon the aforementioned known pixels having a gray-scale value of "white" associated therewith since there are no known decompressed pixels to be used prior to this decompression.

That is, in this embodiment, prediction control unit 144 (during compression) counts the number of rows of pixels which are input into unit 142 and after every 16 rows of pixel data have been processed, in the aforementioned manner, within unit 142, reinitializes the contents of unit 142 such that window 92 (FIG. 3) is brought to a known state (i.e. pixels 96, 98, 100, 102, 104, 106, 108, and 110 are given known values). Control unit 144 then inserts an end of group code which is sent eventually to the Huffman encoder 23 (FIG. 1) where it is encoded within the compressed image. During decompression, control unit 144 recognizes each of the end of group commands (which are placed on bus 72) and causes the assembly 142 to be reinitialized thereby.

Figure 7:
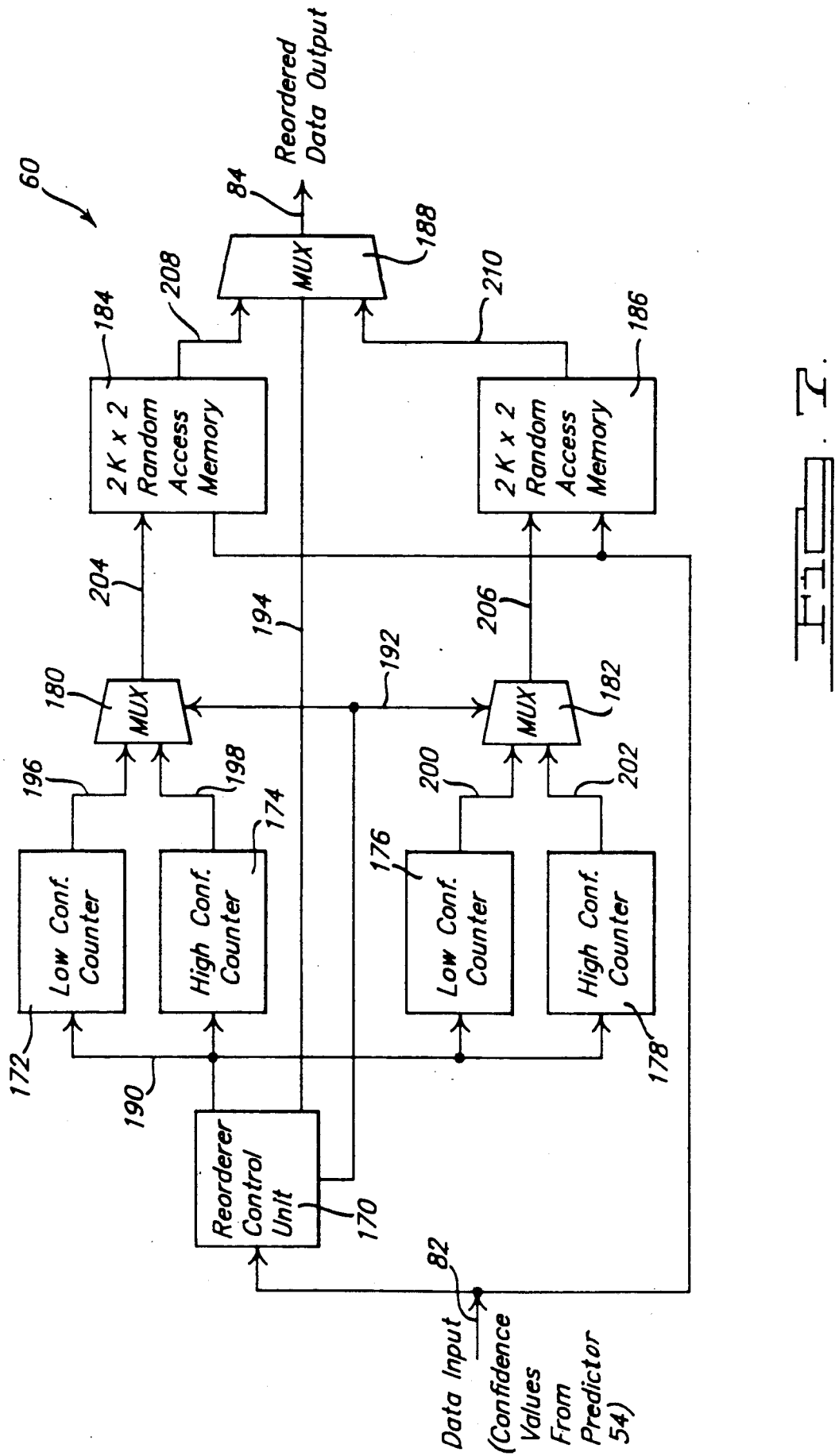
FIG. 7 is a block diagram of the reorderer shown generally in FIG. 2.

Referring now to FIG. 7, there are shown details of the reorderer 60 of FIG. 2 as containing reorderer control unit 170, a low confidence counter 172, high confidence counter 174, low confidence counter 176, high confidence counter 178, multiplexers 180 and 182, 2K×2 bit, in one embodiment, random access memories 184 and 186, and multiplexer 188. Specifically, the reorderer control unit 170 is coupled to counters 172, 174, 176 and 178 by bus 190 and is further coupled to multiplexers 180 and 182 by bus 192. Further, reorderer control unit 170 is coupled to multiplexer 188 by bus 194.

Counters 172 and 174 are coupled to multiplexer 180 by buses 196 and 198 respectively. Counters 176 and 178 are coupled to multiplexer 182 by buses 200 and 202 respectively. Multiplexers 180 and 182 respectively produce outputs on buses 204 and 206 which are respectively input into the memories 184 and 186. The memories 184 and 186 further, each produce an output on buses 208 and 210 respectively, which are both input into multiplexer 188. The multiplexer 188 produces an output signal on the bus 84 which is then input into a run length counter 62 (FIG. 2) Further, the confidence values associated with signals on the bus 82 are input into reorderer control unit 170, while the actual output data, on bus 82, associated with predictor 54 is input into random access memories 184 and 186.

In compression mode operation, the first row of pixels associated with signals on the bus 82 are written in a typical manner into the random access memory 184. In the preferred embodiment of this invention, counter 172 has an initial value of approximately 2,047 (in order to address all "2K" locations of memory 184) while counter 174 has an initial value of approximately zero. As each pixel enters reorderer 60, on bus 82, its confidence bit value (also on bus 82) is examined by reorderer control unit 170 and if the confidence value is a logical one, the associated data is written to memory 184 at locations specified by the counter 174 through signals on bus 198 and multiplexer 180. This address then is input into memory 184 by signals on bus 204. Reorderer control unit 170 permits this passing of address information by counter 174 to random access memory 184 by an address select signal on the bus 192.

Alternatively, if the incoming pixel data on bus 82 has a logically low confidence bit value associated therewith, then it is made to be written to another section of random access memory 184 identified by the output of counter 172. That is, the output of the counter 172 is represented by signals on the bus 196 and is input into the multiplexer 180. Reorderer control unit 170, then by address select signals on bus 192, causes multiplexer 180 to place signals upon bus 204 having the same value as the signals on the bus 196 and this causes the memory 184 to place the associated data on signals on the bus 82, to the address specified by the counter 172 therein.

Every time the contents of the counter 174 are placed by multiplexer 180 upon signals on bus 204 the counter 174 is incremented. Additionally, every time signals on bus 196 are input into memory 184 the counter 172 is decremented. The aforementioned incrementation and decrementation of counters 174 and 172 are controlled by reorderer control unit 170 in a typical manner by signals on bus 190. This aforementioned process continues until a row of prediction differences has been written to memory 184.

The counters 176, 178; multiplexer 182; and memory 186 are arranged to work in a co-operative arrangement which is substantially similar to the aforementioned co-operation of the counters 172 and 174 with the multiplexer 180 and memory 184. These counters 176 and 178, multiplexer 182, and memory 186 are used after the random access memory 184 has received a complete row of prediction difference values. This allows for the random access memory 186 to be filled while data is output from the random access memory 184. This data output is represented by signals on bus 208 to multiplexer 188. Alternatively, after the random access memory 186 has received a complete row of prediction differences, its contents are output and this output is represented by signals on the bus 210 to the multiplexer 188. The reorderer control unit 170 defines which of the input signals on buses 208 and 210 are placed upon signals on bus 84 by multiplexer 188 by use of the typical address select signals on bus 194 thereto and also determines when memories 184 and 186 contain a complete row of predicted difference data by receiving a typical "end-of-scan" signal from transposer 50.

Hence, in the compression operation, the data is output to the run length counter 62 (FIG. 2) by signals on bus 84 according to the confidence values obtained from predictor 54 which were input into reorderer 60 by signals on buses 82. The run length counter 62 then generates typical run length counts associated with this reordered data and places these counts on signals on bus 21 to the Huffman encoder 23 (FIG. 1). It has been shown that this reordering of data into "high confidence" and "low confidence" segments associated with random access memories 184 and 186 has resulted in relatively longer runs and a more efficient Huffman compression and coding since the reordered data allows for longer runs. The compression operation of this invention is lossless (i.e., virtually no data is lost in the compression process).

In one embodiment of this invention, the reorderer control unit 170 comprises a sequential state machine which examines the confidence values on bus 82 and issues one of two outputs as a result thereof to counters 172 and 174 or to counters 176 and 178. Additionally, unit 170, by the confidence values, controls the output of multiplexers 180 and 182 and, based upon the receipt of an "end-of-scan" signal from transposer 50, knows when the memories 184 and 186 have a row of prediction differences therein. Additionally, unit 170 places pixels from memories 184 and 186 onto buses 208 and 210 in order of increasing addresses (specified by signals on buses 204 and 206 respectively). That is, pixels having an address of zero are read first and pixels having an address defined by the maximum values of counter 172 and 176 are read last in the embodiment of this invention.

Figure 8:
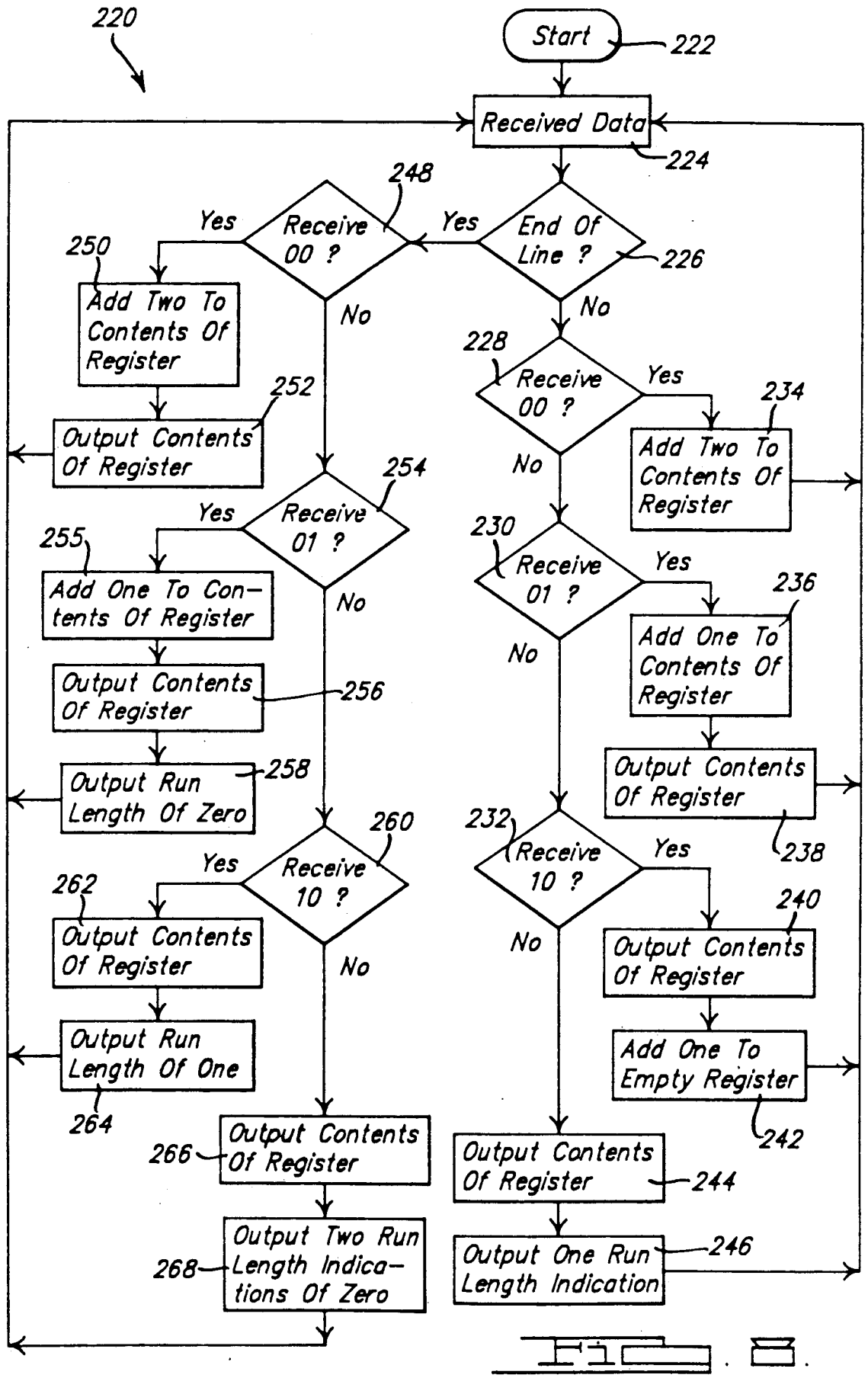
FIG. 8 is a flowchart describing the operation of the run length counter shown generally in FIG. 2.

Referring now to FIG. 8, there is shown a flowchart 220 which describes the operation associated with the run length counter 62 of FIG. 2 which, in the preferred embodiment of this invention, is a sequential state machine. After the beginning step 222, clearing a run length register to zero, is completed, the run length counter 62 in step 224 is made to receive reordered prediction difference value data received by signals on bus 84 (FIG. 2). Each pixel associated with the acquired image is made to contain two bits of a prediction difference value associated therewith. Thus, the run length counter 62 is made to accept two bits of reordered prediction difference value data via signals on bus 84.

After receiving two bits of prediction difference value data in step 224, the run length counter 62 enters step 226 which requires it to determine if these two bits of prediction difference value data received in step 224 represents the last bits in a line of data associated with the transposed image of transposer 50 (FIGS. 2-4). If these two bits of predicted difference value data do not represent the end of the line, then run length counter 62 is made to make the determinations of the actual values associated with the received predicted difference value data and to compare this observed value in the steps 228-232.

That is, if the received difference value data comprises two logically low bits, then step 228 requires that step 234 be immediately followed thereby which requires the addition of two to the contents of a run length counting register by counter 62. This is done since run length counter 62, in this embodiment, is made to count the number of consecutive zeros following each one in the received difference value data associated with signals on the bus 84. After step 234 has been completed, then the run length counter 62 is directed back to the step 224 in order that it may receive two new bits of data via the bus 84.

If the determination in step 228 is that the difference value data does not comprise two logically low bits, then step 228 is followed by step 230 which requires the run length counter 62 to determine if the received difference value data comprises a logically low bit followed by a logically high bit. If the determination in step 230 is affirmative, then the run length counter 62 enters step 236 thereafter in which it is directed to add one to the contents of the run length counting register and thereafter, in step 238 to output the contents of this run length counting register on bus 21.

Step 238 is then followed by step 224 which requires the run length counter 62 to receive two new bits of difference value data along signals on bus 84. If the determination in step 230 is negative, then step 232 is made to immediately follow therefrom and which requires the run length counter 62 to determine if the two bits of received difference value data comprise a logically high bit followed by a logically low bit. If this determination is affirmative, then the run length counter 62 is directed to the step 240 immediately thereafter.

Step 240 requires run length counter 62 to immediately output the contents of its run length counting register onto bus 88 and then to enter step 242 which requires run length counter 62 to add one to its now empty register. Step 242 is immediately followed by step 224 which requires the run length counter 62 to receive two new bits of difference value data by signal on bus 84.

If the determination in step 232 is negative, then the run length counter 62 is immediately directed to the processing of step 244 which requires the run length counter 62 to output the contents of its run length counting register onto bus 21 and thereafter, in step 246, to output a run length of zero onto bus 21. Step 246 is then followed by step 224 which requires the run length counter 62 to received two new bits of prediction difference value data.

If the determination in step 226 is that the received error data associated with step 224 represents an end of line, then the run length counter 62 is immediately directed to process step 248 which requires the run length counter 62 to determine if the received difference value data is represented by two logically low bits. If the result of the determination in step 248 is affirmative, then the run length counter 62 is directed in step 250 to add two to its run length counting register and then immediately thereafter, in step 252, to output the contents of this run length counting register to signal on bus 21 and return to step 224.

If the determination associated with step 248 is negative, then the run length counter 62 is directed to process step 254 thereafter which requires the determination if the received difference value data comprises a logically low bit followed by a logically high bit. If the determination of step 254 is affirmative, then the run length counter 62 is directed to process step 255 which requires counter 62 to add one to its register and thereafter to process 256 immediately, which directs the run length counter 62 to immediately output the contents of its run length counting registers onto bus 21. Step 256 is followed by step 258 which requires the run length counter 62 to additionally output a run length of zero onto bus 21. Step 258 is following by step 224 which requires the run length counter 62 to receive two new bits of difference value data.

Should the determination in step 254 be negative, then the run length counter 62 is directed to immediately process step 260 thereafter which requires the run length counter 62 to determine if the received difference value data comprises a logically high bit followed by a logically low bit. If the determination involved in step 260 is affirmative then the run length counter 62 is directed to immediately process step 262 thereafter which requires the run length counter 62 to immediately output the contents of its run length counting register onto bus 21 and thereafter to process step 264. Step 264 then requires the run length counter 62 to output a run length of one onto bus 21 and clear the register. Step 264 is followed by step 224 which requires the run length counter 62 to receive two new bits of difference value data.

Should the determination involved in step 260 be negative, then the run length counter 62 is directed to process step 266 immediately thereafter which requires the immediate output of the contents of its run length counting register onto bus 21 and which to process step 268 thereafter. Step 268 requires the run length counter 62 to output two run lengths indications, each having a value of zero, onto bus 21. Step 268 is then followed by step 224 which requires the run length counter 62 to receive two new bits of difference value data by signals on bus 84. It should be noted that the run length register is cleared, after all steps of flowchart 220, requiring an output therefrom.

In decompression, as mentioned earlier, the overall objective is to obtain compressed data which is present as an input signal on bus 42 and cause this compressed data to be decompressed. This decompressed data should then represent substantially the same image as was seen before the aforementioned compression took place. In the decompressor operation mode (i.e., in any of workstations 38 of FIG. 1), the compressed data is received by the typical Huffman decoder 27 where it is decoded and sent to run generator 29, by bus 43. Run generator 29, a sequential state machine (in one embodiment of this invention) then examines each of the decoded Huffman values and outputs on bus 45, a run comprising a logical one followed by a number of zeros equal to the binary number represented by the decoded Huffman value. This logical one which is used as the first bit in all runs, also allows the decompressor front end 56 to detect errors associated therewith. The binary data is received by the decompressor front end 56 by signals on the bus 45 and is input into the multiplexer 58 by signals on the bus 80.

Generally, the decompressor front end 56 formats the serial bit stream of the data on bus 45 into rows of two-bit reordered prediction differences. The serial stream of two-bit differences is then input onto bus 80 and input to multiplexer 58 (FIG. 2) which has previously been jumpered (by grounding predetermined pins of the ASIC) into a decompression configuration and which then outputs these signals on bus 80 to signals on bus 82 and then to reorderer 60.

Specifically, the decompressor front end 56 is, in one embodiment, a sequential state machine and receives bits in a serial stream from the run generator 29 by bus 45 and discards the first bit from every line. The decompressor front end 56 then formats each pair of succeeding bits into two bit pixels and passes these pixels to the reorderer 60 through the co-operation of buses 80 and 82 and multiplexer 58 (FIG. 2).

The decompressor front end 56 also contains a counter which is initialized, by a user of apparatus 25, with the scan line length. This counter decrements each time the decompressor front end 56 outputs a two bit pixel therefrom. When this counter reaches zero, the front end outputs an end of line signal to reorderer 60 and the counter reinitializes or resets. The decompressor front end 56 also passes the aforementioned encoded end of group codes, obtained from the encoder and decoded by decoder 27 (FIG. 1), to the reorderer 60.

The decompressor front end 56 also checks for errors which might have occurred during the transmission or storage of the compressed data by comparing the first bit of every line with a logical one. If these values aren't equal, the decompressor front end 56 knows that an error has occurred. Similarly, decompressor front end 56 checks the contents of its counter when an end of group signal is received from the run generator 29, by bus 45. If the counter isn't zero, at this time, then another error condition is discovered. These errors may be transmitted to an error processor externally positioned from apparatus 25. The end of group signal is transmitted to the reorderer 60 by buses 80 and 82 (FIG. 2) for the aforementioned use thereby.

In the reorderer 60, during decompression, a first row of pixels is then written into the random access memory 184 (FIG. 7) upon receipt of the signals on buses 80 and 82 from the decompressor front end 56. The counter 172 generates the address for these pixels counting up from a predefined initial state of zero. When a complete line of pixels has been written into memory 184, counter 172 is held at its current value by assembly 170 and the counter 174 is cleared to zero. Then, while the next line of pixels is being written into the random access memory 186 (FIG. 7), as previously described, the first line of pixels is read from random access memory 184. If the confidence value for a pixel, within the line that is being read is logically high, then the pixel is read from the location indicated by the value of the counter 174 and the counter 174 is incremented by assembly 170. If the confidence value associated therewith is substantially zero, the pixel data is read from the address indicated by counter 172, in a manner previously specified, and the counter 172 is decremented by assembly 170. With reference to FIG. 2, these confidence values are input to assembly 170 by predictor 54 through bus 78 during the decompression.

The output associated with signals on bus 84 (FIG. 2) is completed when the counter 172 (FIG. 7) is substantially equal to the counter 174 or when the counter 176 is substantially equal to the counter 178. This output signal on bus 84 is input to bus 70 and subsequently is an input into the multiplexer 52 which has been previously jumpered to output the signals on bus 70 onto bus 72 and then to predictor 54.

The predictor 54 then couples signals on bus 72 to the Exclusive-OR gate 146 (FIG. 6) and performs an Exclusive-OR operation upon the associated prediction table address contents with the data represented on signals on bus 72 to produce decompressed data on signals on bus 90, in the manner previously described. This decompressed data is then outputted from predictor 54 via bus 90 and substantially corresponds to the previously uncompressed image.

The compression operations associated with apparatus 25 may be more clearly described with reference to FIGS. 9-14, while the decompression operation associated with apparatus 25 may be more fully described with reference to the flowchart shown in FIG. 15. Specifically, flowchart 300 of FIG. 9 details the general initial sequence of operations associated with the use of apparatus 25 in a compression operation. That is, after the initial step 302 has been completed, step 304 is entered which requires an operator of apparatus 25 to determine if a prediction state table and Huffman table exist. If such a prediction state table and Huffman table don't exist, then step 304 is followed by step 306 which requires a user of apparatus 25 or a typical designer to perform an initialization function.

If the prediction state table and Huffman tables already exist, then step 304 is followed by step 308 (which follows step 306 as well). Step 308 requires apparatus 25 to predict what the image will look like based upon statistics using a prediction state table. After step 308 is completed, apparatus 25 is directed to perform step 310 which requires the taking of a difference between the predicted and the real image. Step 312 then follows step 310 and requires apparatus 25 to reorder the difference (of step 310) in accordance with a predetermined confidence factor. The reordering associated with step 312 is followed by step 314 which requires apparatus 25 to encode the string associated with the difference of step 312 in a conventional Huffman coding arrangement. Step 314 is followed by step 316 which requires apparatus 25 to send the compressed image out as compressed data and step 316 is followed by step 318 which defines the end of the sequence of operations associated with apparatus 25 and the user therewith.

Figure 9:
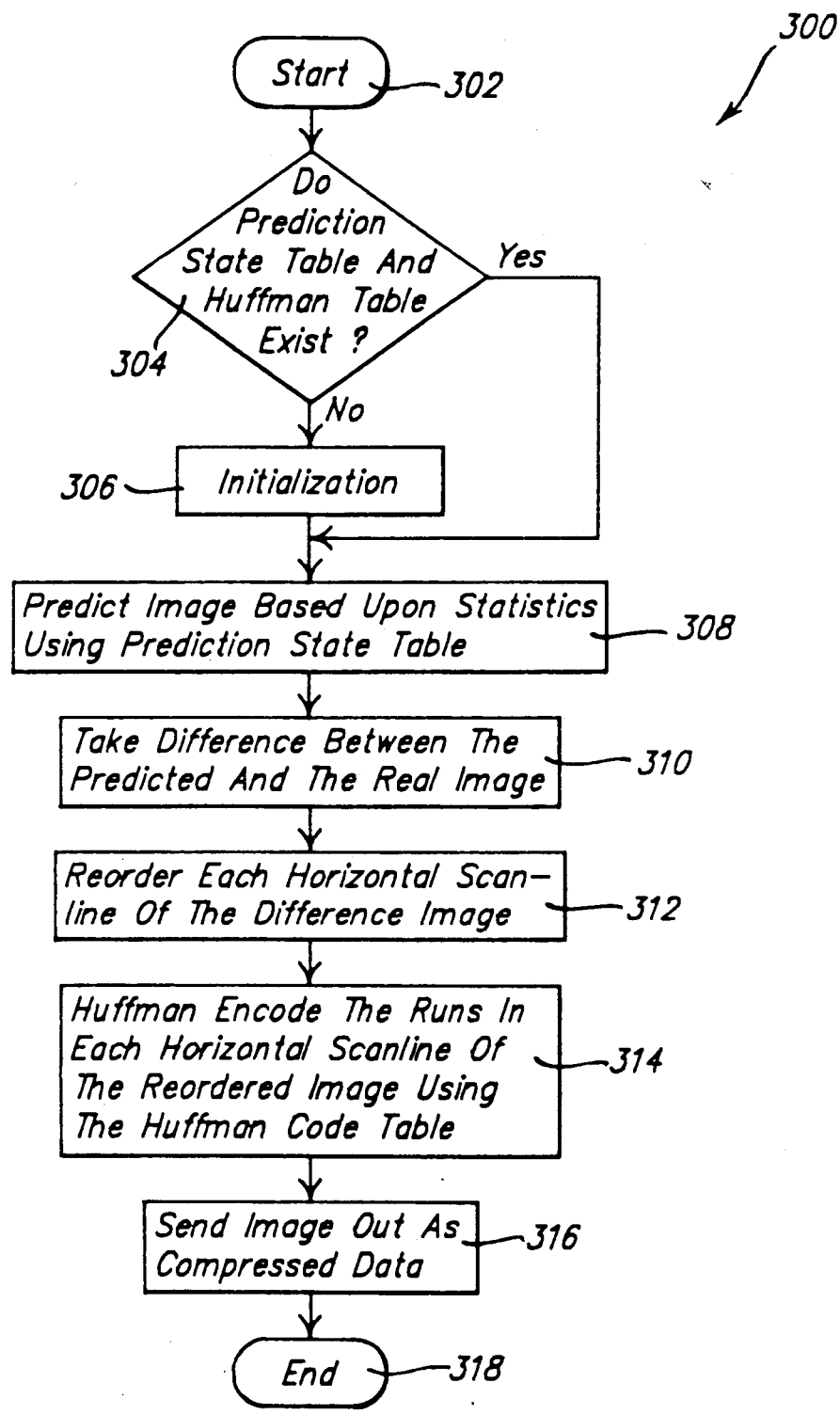
FIG. 9 is a flowchart generally illustrating the operation and use of the preferred embodiment of this invention which is shown generally in FIG. 2.

Reference is now made to FIGS. 10($a$-$c$) which detail the steps associated with the initialization step 306, of flowchart 300 of FIG. 9. Specifically, the initialization sequence associated with step 306 requires an initial step 320 which requires the user of apparatus 25 to define a confidence threshold below which a confidence level associated with the predicted value will be "low". Next, a user of apparatus 25 must, in the step 322, define an appropriate window configuration which will be used in the coding algorithm. As seen earlier, in FIG. 3, the window configuration used in the preferred embodiment of this invention results not only in the ability to decompress an obtained image, but also is substantially unbiased in all directions.

After a window configuration is defined by a typical user or designer of apparatus 25, in step 322, the next step 324 requires a user of apparatus 25 to select a finite number "N" of documents that are representative (in image) of the class of documents that will be compressed. That is, if apparatus 25 is used to compress check documents, then some number of check type document images must be utilized or identified in this initialization process. Steps 326 and 328 simply initialize two variables denoted as "M" and "P" which are presented here simply for explanatory purposes only.

The next step 330 requires the user of apparatus 25 to select the document associated with the variable "M" from the finite number of documents that were selected in step 324. Step 332 follows step 330 and requires the apparatus 25, for the pixel identified by the variable "P" which is within the document identified by the variable "M", to overlay the prediction window which was defined in step 322 thereover.

This is followed by step 334 which requires apparatus 25 to take the gray-scale value of all the pixels within the prediction window configuration and concatenate them together in a previously specified manner. This is done in the predictor stage 54 (FIG. 2). Step 336 then requires the predictor 54, of apparatus 25, to generate a prediction address based upon this concatenation. Step 338 follows step 336 and simply requires apparatus 25 to associate the generated address with the pixel. This again is done, as previously described, in predictor 54. Step 340 follows step 338 and requires the recordation of the predicted pixel and associated prediction address in a standard type statistics table. This is typically done by a user of apparatus 25.

Step 340 is followed by step 342 which requires a determination if al the pixels in the document identified by the variable "M", have been associated with a prediction address. If this has not been the case, then the associated variable value of "P" is incremented in step 344 and steps 332-342 are again completed by apparatus 25 and a user therewith. If all the pixels in the document identified by the variable "M" have been associated with a prediction address, then step 342 is followed by step 346 which requires a user to determine if any of the finite number of documents, identified in step 324, is left unprocessed. If there are some documents unprocessed, then step 346 is followed by step 348, which increases the value of the variable "M" and requires step 348 to be followed by steps 328-346. If the answer to the question posed in step 346 is negative, then step 346 is followed by step 350 which requires the user of apparatus 25 to convert the created statistics table to a prediction table containing the confidence value associated with step 320. The prediction value for each address is set to the most frequently occurring gray-scale value for that address. If the frequency of occurrence of the prediction value for that address is greater than the confidence threshold, then the confidence value for that address is set to "high" or a logical one, otherwise "low" or zero.

Step 350 is then followed by step 352 which requires a user of apparatus 25 to select a finite number "N" of documents that are representative of the class of documents that will be compressed. The documents associated with step 352 could be substantially similar to the class of documents associated with step 324. Step 352 is then followed by step 354 which initializes a counter "M" to one. The counter associated with step 354 could be, in one embodiment, substantially similar to the counter associated with step 326.

Step 354 is then followed by step 356 which requires apparatus 25 to select the document associated with the variable "M", in step 354, from the finite number of documents that were selected in step 352. Step 356 is followed by step 358 which requires apparatus 25 to predict the image of the document defined in step 356 using the prediction state table which was generated in step 350. Step 358 is followed by step 360 which requires apparatus 25 to take the difference between the predicted image, associated with step 358, and the real image, associated with the document defined in step 356.

Step 360 is then followed by step 362 which requires apparatus 25 to reorder each horizontal scan line associated with the difference between the predicted and the real image of step 360. Step 362 is then followed by step 364 which requires apparatus 25 to expand each gray-scale value of each horizontal scan line of the reordered difference image into binary form. Step 364 is then followed by step 366 which initializes a variable "R", used here for explanatory purposes only.

Step 366 is then followed by step 368 which requires apparatus 25 to count the run lengths associated with the run defined by the variable "R" in step 366 and associated with the reordered difference image of the document defined by the variable "M" in step 356. Step 368 is then followed by step 370 which requires a user of apparatus 25 to record the length of the run associated with step 368 in a statistics table. Step 370 is then followed by step 372 which requires apparatus 25 to determine if all of the runs or lines in the document defined by the variable "M", in step 356, have been recorded.

If the determination in step 372 is that all of the runs in the document associated with the variable "M" have not been recorded, then step 372 is followed by step 374 which requires an incrementation of the variable "R" and step 374 is then followed by step 368. If the determination in step 372 is that all of the lines associated with the document defined in step 356 has been recorded, then step 372 is followed by step 376 which requires a determination, by a user of apparatus 25, if any of the finite number of documents associated with step 352 are left. If the determination of step 376 is that there are some documents that are left, then the variable "M" is incremented in step 378 and step 378 is then followed by step 356. If the determination of step 376 is that all the documents associated with step 352 have been processed, then step 376 is followed by step 380 which requires a user of apparatus 25 to convert the created statistics table to a probability table containing the probability of a run of each length occurring.

Step 380 is then followed by step 382 which requires a user of apparatus 25 to generate a Huffman code table from the probability table, associated with step 380, and containing a unique code word for run lengths of 0-31, a unique code word for run lengths which are even multiples of 32, and a unique code word for "end-of-group" and "end-of-image" symbols (in one embodiment). Step 382 is then followed by step 384 which defines the end of flowchart 306. The aforementioned prediction state table (step 350) and Huffman table (step 382) are needed for decompression as well.

Figure 10A:
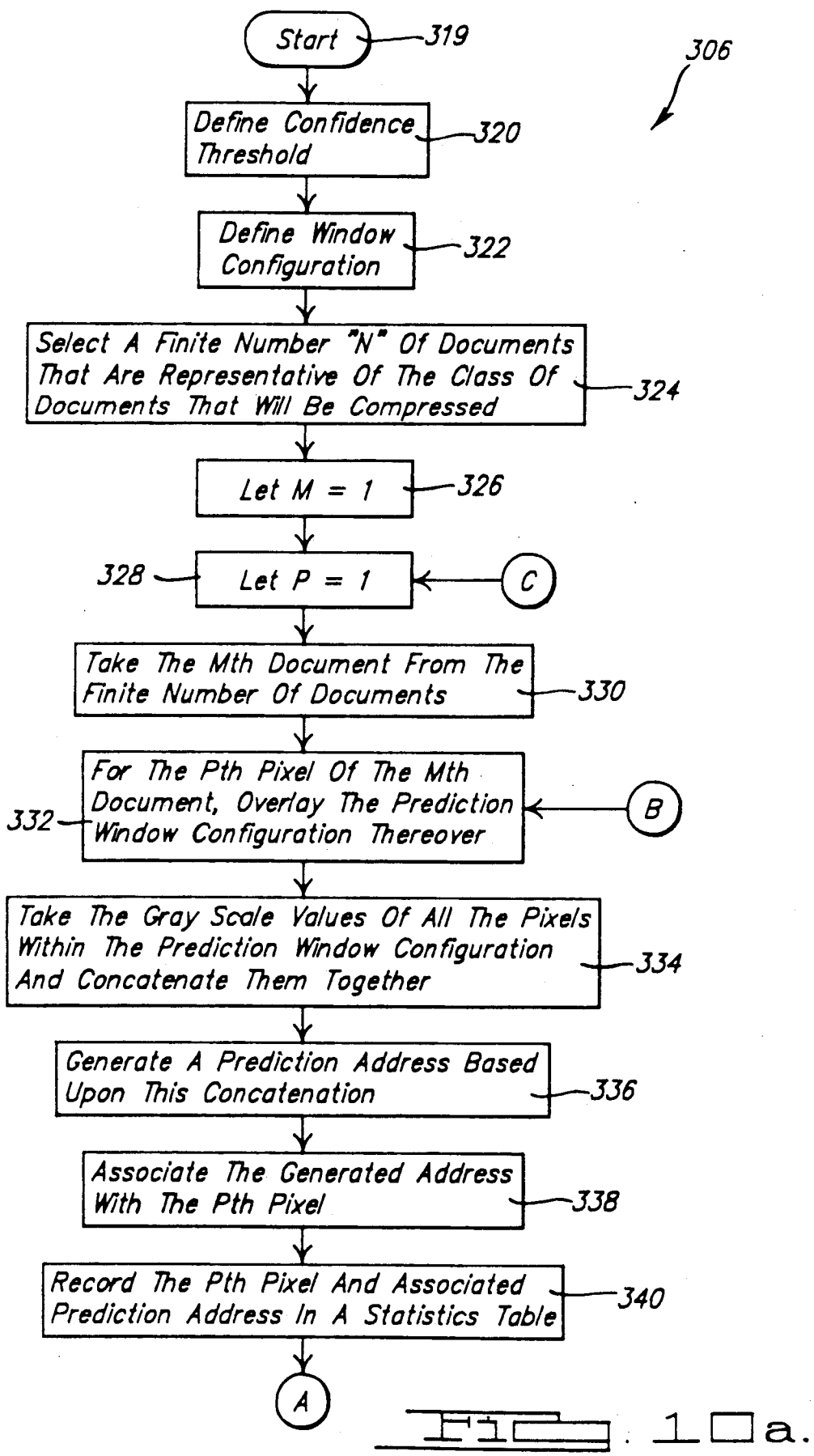
FIGS. 10(a-c) are flowcharts detailing the initialization step of the flowchart shown generally in FIG. 9.
Figure 10B:
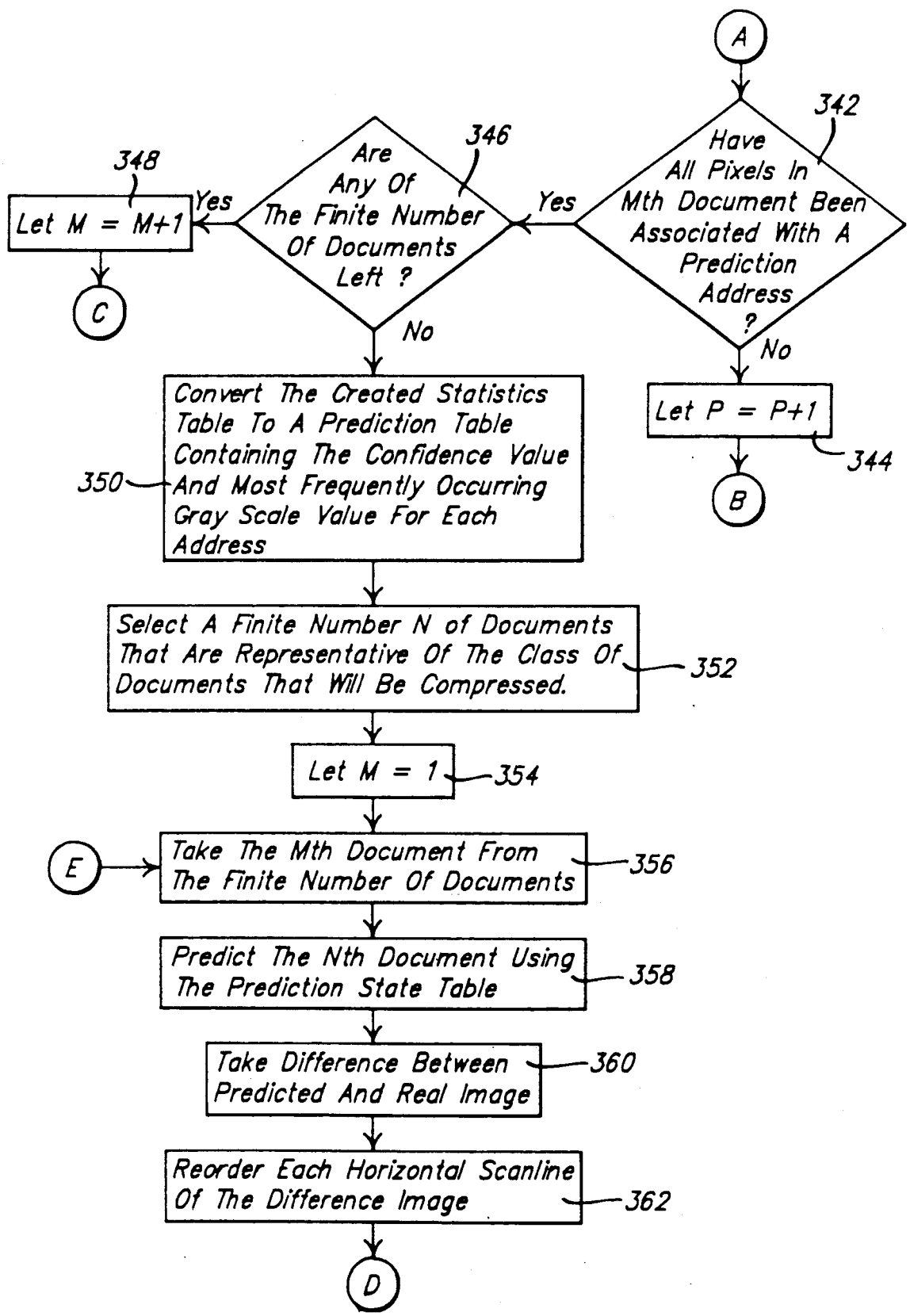
Figure 10C:
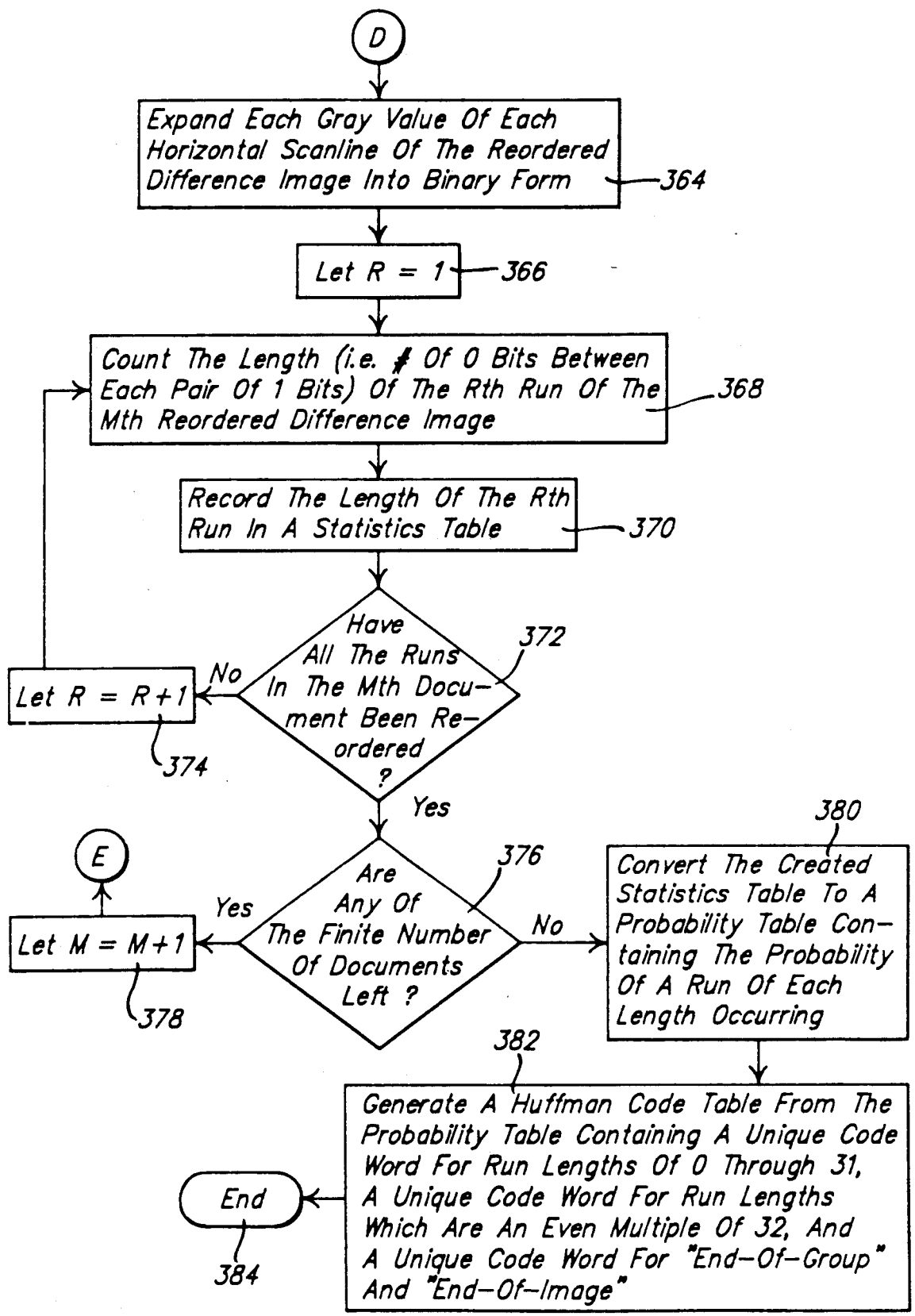
Figure 11:
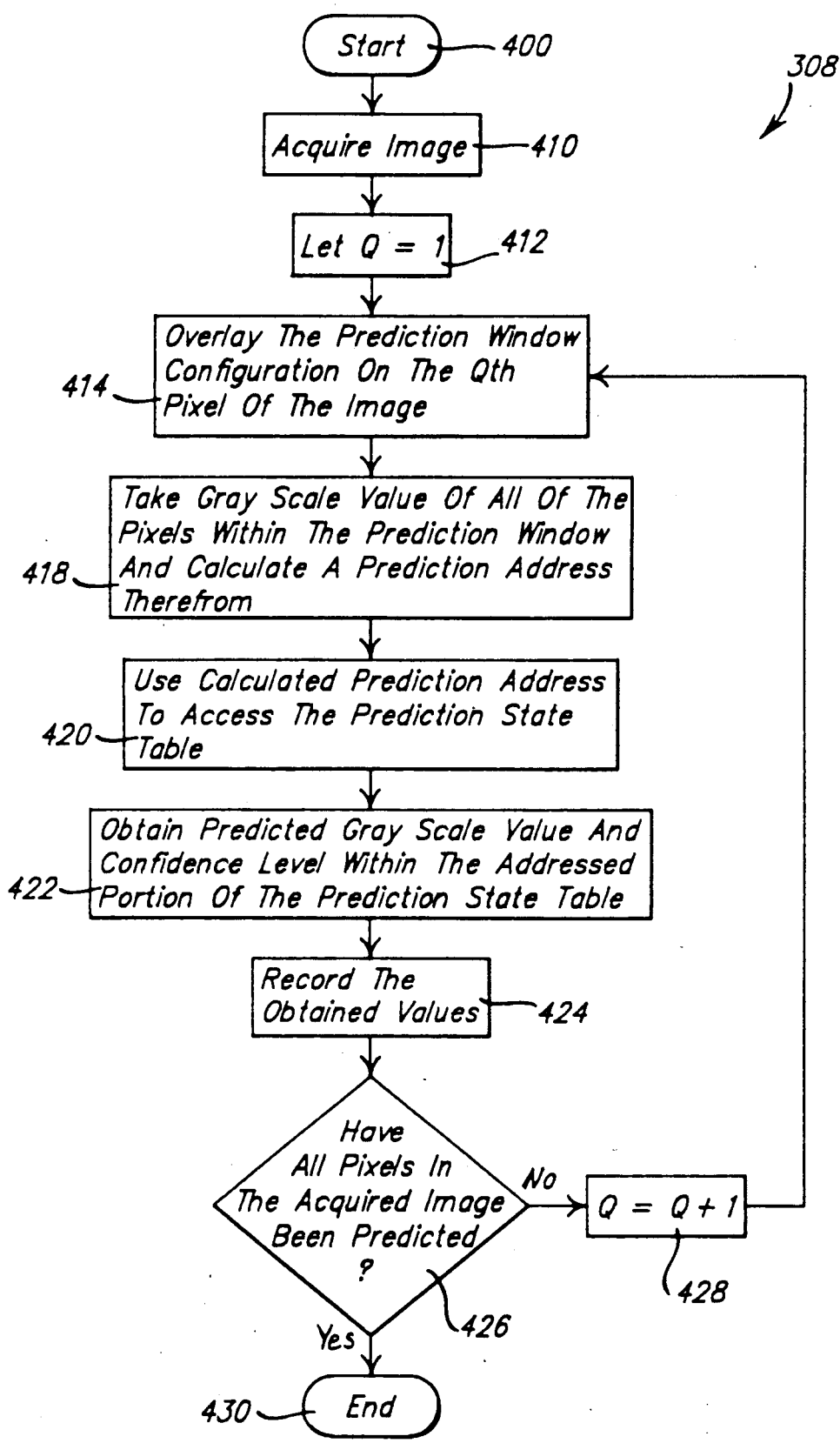
FIG. 11 is a flowchart detailing the prediction step shown generally in FIG. 9.

Referring now to FIG. 11, there is shown the requirements of step 308 associated with flowchart 300 of FIG. 9. That is, the initial step 400 is followed by step 410 which requires apparatus 25 to acquire a desired image. Step 410 is followed by step 412 which defines a variable "Q" presented here for explanatory purposes only. Step 412 is followed by step 414 which requires apparatus 25 to overlay the prediction window already specified on the pixel of the image specified by the variable "Q". Step 418 follows step 414 and requires apparatus 25 (i.e. prediction 54) to take the gray-scale value of all the pixels within the prediction window and then calculate a prediction address therefrom. Step 420 then follows step 418 and requires apparatus 25 to use the calculated a prediction address to access the prediction state table which has been identified in step 306 (FIGS. 10a, 10b, 10c).

Step 420 is followed by step 422 which requires apparatus 25 to obtain the predicted gray-scale value and confidence level within the addressed portion of the prediction state table. This is done by the accessing of lookup table 74 (FIG. 2) which, in the preferred embodiment of this invention, contains the prediction state table and which is accessed by predictor 54 by signals on bus 76.

Step 424 follows step 422 and requires apparatus 25 to record the obtained value of the predicted gray-scale value. In the preferred embodiment of this invention, this obtained value is output by signals on bus 78 from the predictor 54.

Step 426 follows step 424 and requires the determination if all of the pixels of the acquired image have been predicted. If they have not, then step 426 is followed by step 428 which increments the variable "Q" and requires apparatus 25 to process step 414 thereafter. If the determination of step 426 is that all pixels have been predicted, then step 426 is followed by step 430 defining the end of step 308.

Figure 12:
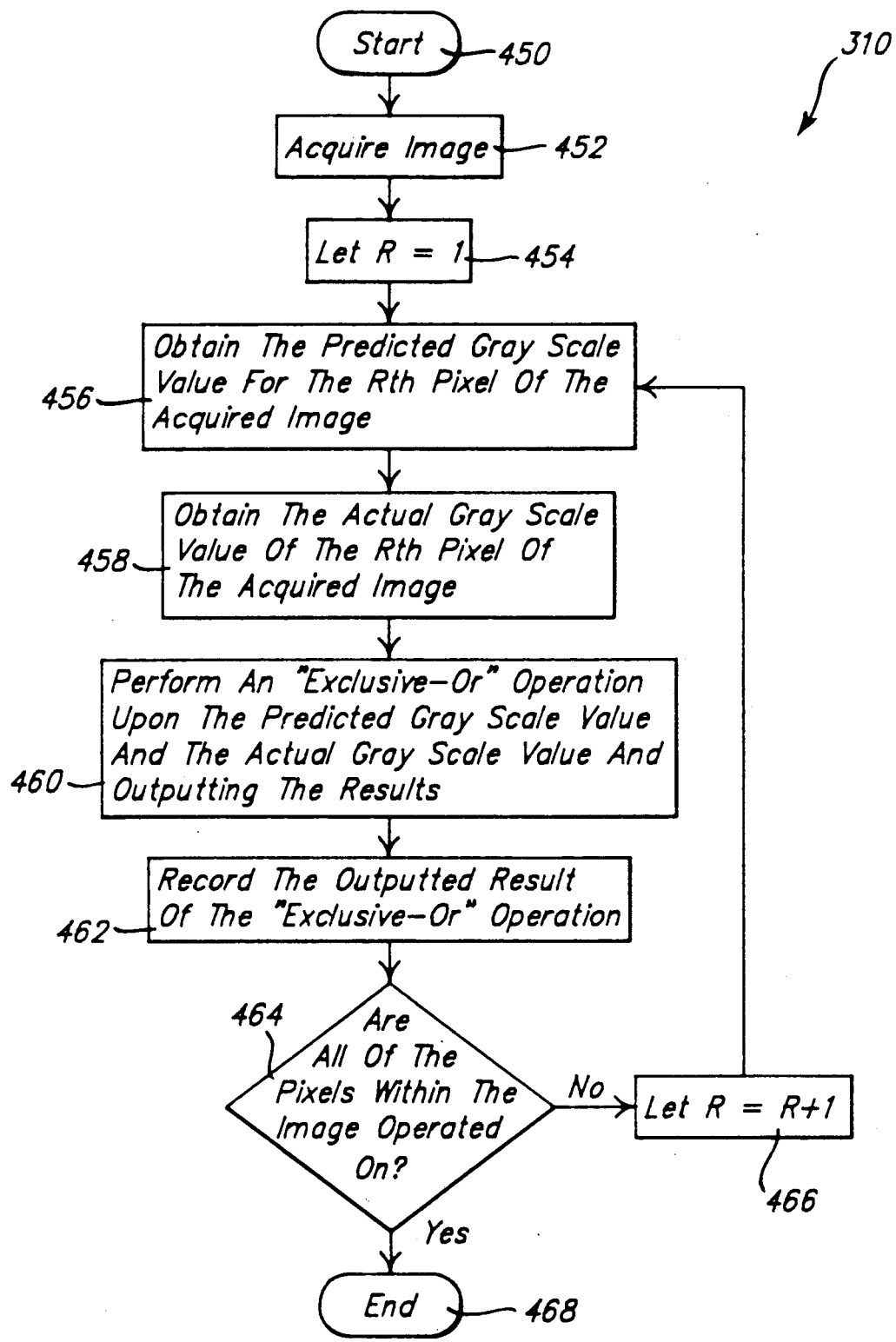
FIG. 12 is a flowchart illustrating the difference step shown generally in FIG. 9.

Referring now to FIG. 12, there is shown a sequence of operations associated with step 310 of flowchart 300 (FIG. 9). Specifically the initial step 450 is followed by step 452 which requires apparatus 25 to acquire the desired image. Thereafter, step 454 defines a variable "R" used here for explanatory purposes only and is followed by step 456 which requires apparatus 25 to obtain a predicted gray-scale value for the pixel (defined by the variable "R") of the acquired image.

Step 458 follows step 456 and requires the obtainment by apparatus 25 of the actual gray-scale value of the pixel defined by the variable "R" within the acquired image. Step 460 then requires an Exclusive-OR operation upon the predicted and the actual gray-scale value and outputs the result therefrom. This is done in predictor 54 by use of Exclusive-OR gate 146. Step 462 then follows step 460 and requires the recordation of the output result of the Exclusive-OR operation. Step 464 follows step 462 and requires the determination if all of the pixels have been operated upon. If they have not, then the variable "R" associated with step 454 is incremented in step 466 and steps 456–464 are repeated. If the determination associated with step 466 is affirmative, then step 468 follows step 464 and which defines the end of step 310.

Figure 13A:
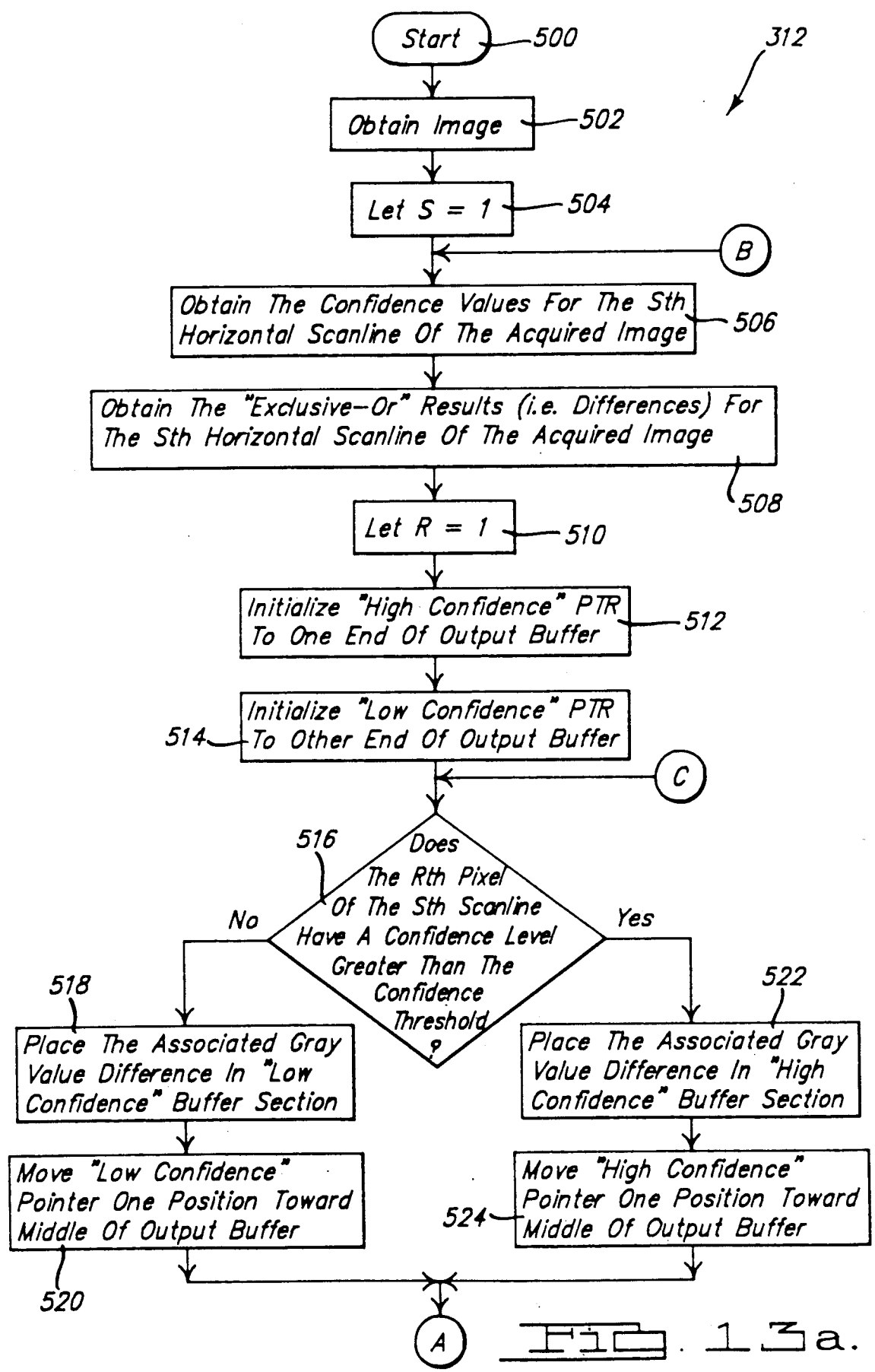
FIGS. 13(a-b) are flowcharts illustrating the reordering step shown generally in FIG. 9.
Figure 13B:
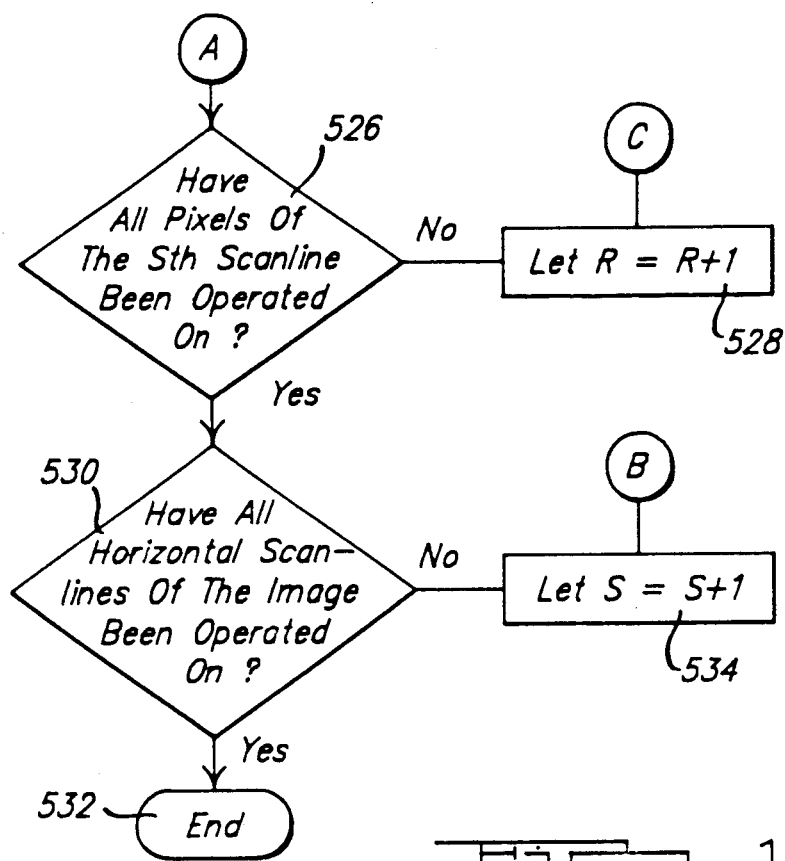

Referring now to FIGS. 13(a–b), there is shown the sequence of steps associated with the reordering step 312 of flowchart 300 (of FIG. 9). This reordering is done, in the preferred embodiment of this invention, by reorderer 60 (FIG. 2). The initial step 500 is followed by step 502 which requires the apparatus 25 to obtain the desired image. Step 504 follows step 502 and defines a variable "S" used here for explanatory purposes only. Step 506 follows step 504 and requires the apparatus 25 to obtain the confidence values for the horizontal scan line associated with the variable "S" of the acquired image. Step 508 follows step 506 and requires the apparatus 25 to obtain the difference values for the horizontal scan line associated with the variable "S" of the acquired image. Step 510 follows step 508 and initializes a variable "R", used here for explanatory purpose only.

Step 512 follows step 510 and requires apparatus 25 to initialize the "high confidence" pointer to one end of an output buffer and step 514, following step 512, requires apparatus 25 to initialize a "low confidence" pointer to the other end of the same output buffer.

Step 516 follows step 514 and requires the determination if the pixel associated with the variable "R" and within the scan line associated with the variable "S" has a confidence value greater than the confidence threshold, which was predetermined. If apparatus 25 determines that the pixel associated with the variable "R" does not have a confidence value greater than the threshold, then the associated gray-scale value difference of the pixel is placed in a "low confidence" buffer section in step 518. Step 518 is then followed by step 520 which requires the "low confidence" pointer to be positioned one step closer toward the middle of the output buffer.

If the determination in step 516 is that the pixel does have a confidence value greater than the confidence threshold, then step 516 is followed by step 522 which requires the apparatus 25 to place the associated gray-scale value difference in the "high confidence" section of the output buffer and requires step 524 to immediately follow step 522. Step 524 requires the movement of the "high confidence" pointer one position toward the middle of the output buffer. Step 526 follows steps 520 and 524 and requires apparatus 25 to determine if all of the pixels in the scan line associated with the variable "S" have been operated upon. If all these pixels have not been operated upon, then step 526 is followed by step 528 which requires an incrementation of the variable "R" and a return to step 516. If the determination associated with step 526 is that all of the pixels have indeed been operated upon, which are associated with the scan line defined by the variable "S", then step 526 is followed by step 530 which requires the determination if all the horizontal scan lines of the acquired image have been operated upon.

If, in step 530, it is determined that all of the horizontal lines have been operated upon, then step 530 is followed by step 532 which defines the end of step 312. If, in step 530, it is determined that all of the horizontal scan lines have not been operated upon, then step 530 is followed by step 534 which requires an incrementation of the variable "S" and a return to step 506 associated with step 312.

Figure 14A:
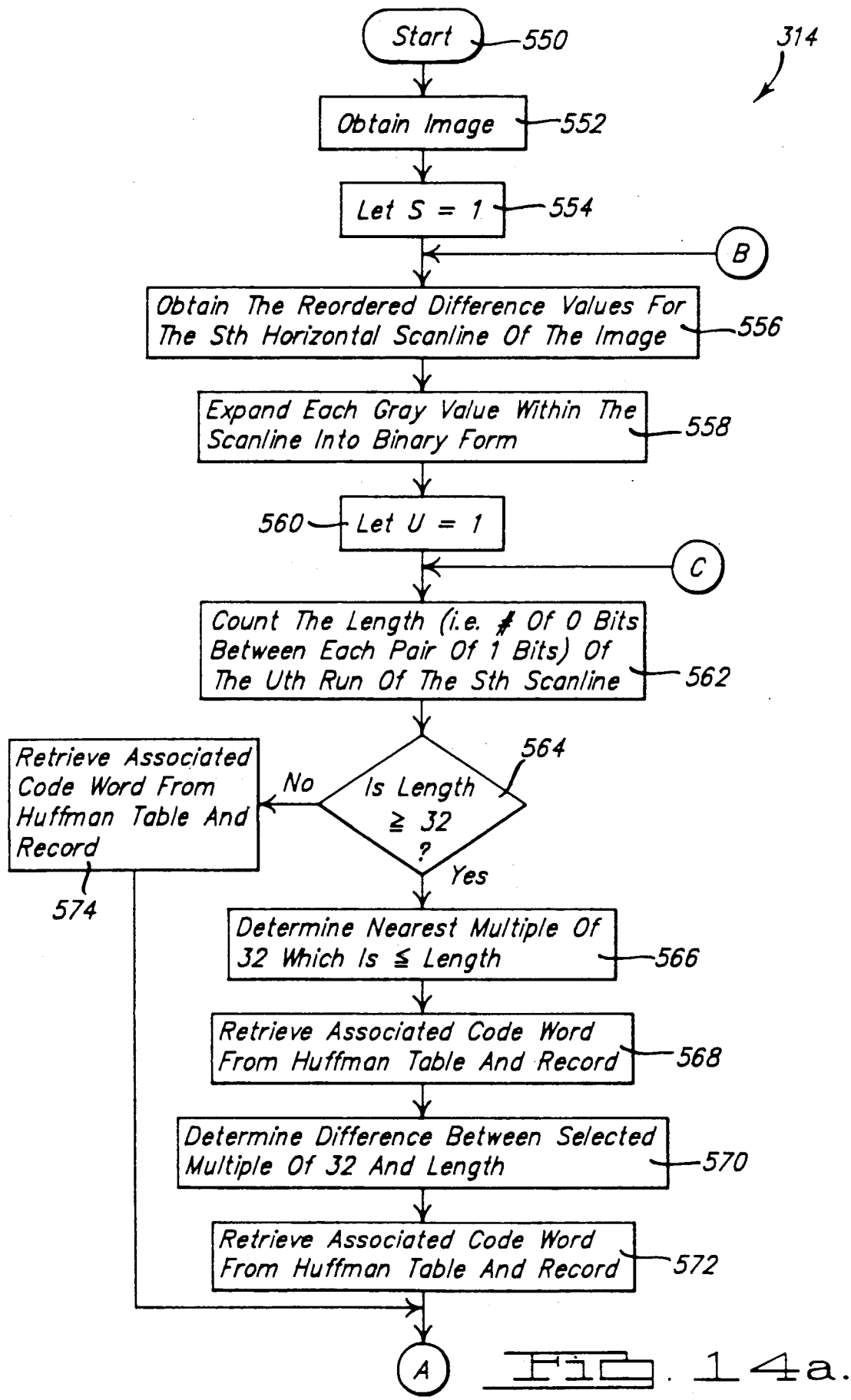
FIGS. 14(a-b) are flowcharts describing the encoding step shown generally in FIG. 9.
Figure 14B:
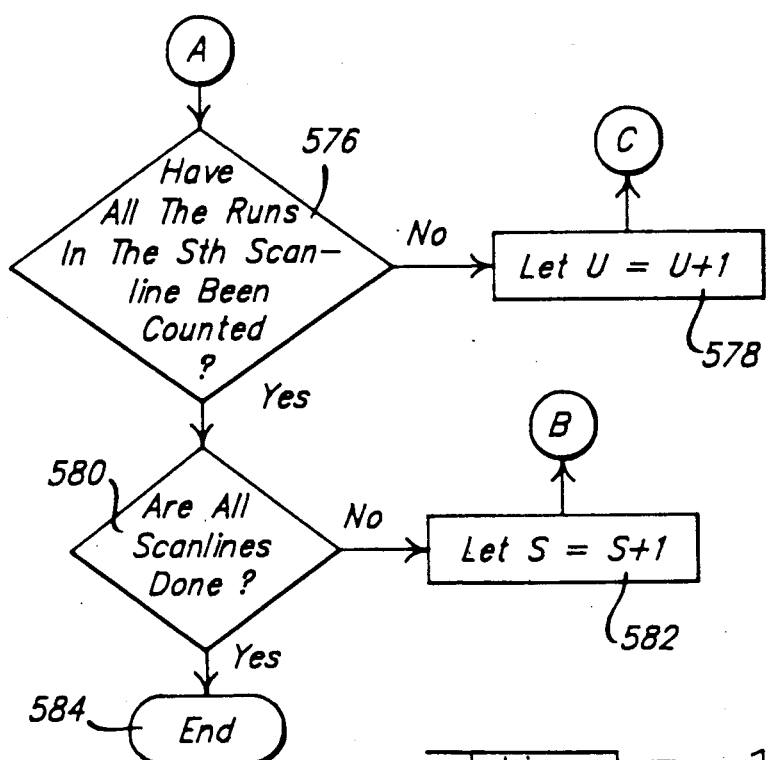

Referring now to FIGS. 14a and 14b, there is shown a sequence of operations associated with step 314 shown in flowchart 300 (FIG. 9). Specifically, step 314 starts with an initial step of 550 followed by step 552 which requires the apparatus 25 to obtain the image. Step 552 is followed by step 554 which initializes the variable "S", used here for explanatory purposes only.

Step 556 follows step 554 and requires the obtainment of the reordered difference values for the horizontal scan line defined by the variable "S" of the obtained image. Step 558 follows step 556 and requires the expansion of each gray-scale value within the scan line into a binary form.

Step 560 follows step 558 and initializes the variable "U", used here for explanatory purposes only. Step 562 follows step 560 and requires the counting of the length of the run defined by the variable "U" associated with the scan line defined by the variable "S". Step 564 follows step 562 and determines if the length, calculated in step 562, is greater than 32.

If the length, in step 564 is determined to be greater than 32, then step 564 is followed by step 566 which requires the determination of the nearest multiple of 32 which is less than or equal to the length associated with step 564. Step 568 follows step 566 and requires the retrieval of the associated code word from a typical Huffman table and the recording of it. Step 570 follows step 568 and requires the determination of the difference between the selected multiple of 32 and the overall length. Step 572 follows step 570 and requires the retrieval of the associated code word of this difference in step 570, from the Huffman table and the recording of it.

If the determination associated with step 564 is negative, than step 564 is immediately followed by step 574 which requires the retrieval of the associated code word from the Huffman table and the recording of it. Step 576 follows both steps 574 and 572 and requires the determination if all the runs in the scan line defined by the variable "S" have been counted.

If all these runs have not been counted, then step 576 is followed by step 578 which requires an incrementation of the variable "U". Step 578 is followed by step 562 of FIG. 14a. If the determination associated with 576 is affirmative, then step 576 is followed by step 580 which requires the determination if all scan lines associated with the obtained image have been completed. If all the scan lines have been completed, then step 580 is followed by step 584, which defines the end of step 314. If all scan lines are not done, then step 580 is followed by step 582 wherein the variable S is incremented by 1, and step 556 of FIG. 14a is entered.

Referring now to FIG. 15, there is shown a flowchart 600 detailing a sequence of steps associated with the decompression of the compressed data shown generally in step 316 in flowchart 300 of FIG. 9. That is, the initial step 602 is followed by step 604 which requires the obtainment of the compressed image by apparatus 25. Step 606 follows step 604 and requires the obtainment of the Huffman code words associated with the compressed image and the conversion of them to runs of bits, grouping the bits into pixels, then the filling of the reorderer buffers.

Step 608 follows step 606 and defines variable "Z" used here for explanatory purposes only. Step 608 is followed by step 610 which requires apparatus 25 to define the pixel of the obtained image and indicated by the variable "Z" such that its associated prediction table address, which is contained in the external lookup table 74, is derived only from filler pixels and/or previously decompressed pixels. This is done so that decompression may be accomplished only upon known states and thus be of a high efficiency and relatively error free.

Step 610 is followed by step 612 which requires apparatus 25 to overlay the prediction configuration window of FIG. 3, over the defined pixel. This is done by predictor 54 in the decompression operation as previously explained. Step 614 follows step 612 and requires apparatus 25 to concatenate the pixels within the window to generate the prediction table address associated with the active pixel. Again, in the preferred embodiment of this invention, step 614 is defined by the predictor 54 in the decompressed mode as previously described.

Step 614 is followed by step 616 which requires apparatus 25 to obtain the associated predicted gray-scale value and confidence value of the pixel to be decompressed from the prediction table. Again, in the preferred embodiment of this invention, this is done by use of the predictor accessing the lookup table 74 by signals on bus 76.

Step 616 is followed by step 618 which requires apparatus 25 to use the confidence value obtained from lookup table 74 to define the access either to the "high" confidence" or the "low confidence" buffer section associated with random access memories 184 and 186. Step 618 is followed by step 620 which requires apparatus 25 to obtain a difference value associated with the pixel to be decompressed and step 620 is followed by step 622 which requires apparatus 25 to perform an Exclusive-OR operation upon a difference value and the predicted value of the pixel to be decompressed. These steps 620 and 622 are accomplished by means of the reorderer 60 and predictor 54 as seen earlier.

Step 622 is followed by step 624 which requires apparatus 25 to output the result of the Exclusive-OR operation and store the same. Step 626 follows step 624 and requires apparatus 25 to determine if all the pixels on the obtained image have been operated upon. If the answer is negative, then step 626 is followed by step 628 which increments the variable "z" and returns to step 610. If the answer to the question in step 626 is affirmative, then step 626 is followed by step 630 which requires apparatus 25 to display the decompressed image. Step 630 is followed by step 632 which defines the end of flowchart 600.

It is to be understood that the invention is not to be limited to the exact construction or method illustrated and described above, but that various changes and modifications may be made without departing from the spirit and scope of the invention as described in the appended claims.

What is claimed is:

1. A data transposer which receives image data having a plurality of pixels associated therewith, said plurality of pixels being arranged in a plurality of columns, each of said columns being uniquely associated with a single vertical scan of said image and having a plurality of rows associated therewith, each of said rows within said columns having a unique one of said plurality of pixels of said image contained therein, each of said columns further including at least one overscan pixel at at least a first end of said column, said data transposer comprising:

pixel packer means, coupled to said image data, for sequentially storing portions of said image data and for outputting said stored portions therefrom;

first memory means, coupled to said pixel packer means, for receiving said output of said pixel packer means;

controller means, coupled to said pixel packer means and to said memory means for causing said pixel packer means to sequentially store and output every portion of said image data and for causing said first memory means to store said received columns of pixels, and for causing the pixels contained in the same rows of each of said columns of said stored image data to be output from said first memory means, said controller means further comprising stripping means, coupled to said pixel packer means, for deleting any overscan pixels present in said columns prior to causing said pixel packer means to store the image data in said first memory means.

2. The data transposer of claim 1 wherein said pixel packer comprises:

second memory means for storing two bits of data therein.

3. The data transposer of claim 1 wherein said first memory means comprises:

a first in first out memory; and a random access memory coupled to said first in first out memory.

4. The data transposer of claim 1 wherein said data transposer further comprises:

pixel unpacker means, coupled to said first memory means, for receiving said pixels output from said first memory means and for sequentially storing and outputting said pixels therefrom.

5. The data transposer of claim 4 wherein said pixel unpacker comprises:

an eight bit data register.

6. The data transposer of claim 5 wherein said pixel unpacker comprises:

an eight bit data register.

7. The data transposer of claim 1, wherein said stripping means includes overscan counting means operative to inhibit the pixel packer means from sequentially storing portions of said image data until said counting means determines that a preselected number of pixels in each column have been received.

8. A data transposer which receives image data having a plurality of image pixels, overscan pixels, and underscan pixels associated therewith, said image data being arranged in a plurality of columns, each of said columns being uniquely associated with a single vertical scan of said image and having a first plurality of rows associated therewith, each of said first plurality of rows containing a unique one of said plurality of overscan pixels, each of said plurality of columns further having a second plurality of rows associated therewith, each of said second plurality of rows containing a unique one of said plurality of image pixels, each of said plurality of column further having a third plurality of rows associated therewith, each of said third plurality of rows containing a unique one of said plurality of underscan pixels, said data transposer comprising:

stripping means, coupled to said image data, for deleting said first and third plurality of rows in each of said plurality of columns and for outputting said plurality of columns containing only said second plurality of rows therein; and pixel packer means, coupled to said stripping means, for sequentially storing portions of said second plurality of rows and thereafter for outputting said stored portions therefrom; and memory means, coupled to said pixel packer means for receiving and storing said output therein and for thereafter, outputting pixels contained in the same row of each of said columns to be output therefrom.

9. The data transposer of claim 8 wherein said pixel packer comprises:

second memory means for storing two bits of data therein.

10. The data transposer of claim 8 wherein said memory means comprises:

a first in first out memory; and a random access memory coupled to said first in first out memory.

11. The data transposer of claim 8 wherein said data transposer further comprises:

pixel unpacker means, coupled to said memory means, for receiving said pixels output from said memory means and for sequentially storing and outputting said pixels therefrom.

12. The data transposer of claim 8, wherein said stripping means includes overscan counting means operative to inhibit the pixel packer means from sequentially storing portions of said image data until said counting means determines that a preselected number of pixels in each column have been received.

13. A method for the transposition of image data having a plurality of pixels associated therewith which are arranged in a plurality of columns, each of said columns being uniquely associated with a single vertical scan of said image and having a first and a second plurality of rows associated therewith, each of said first plurality of rows within said columns having a unique one of said plurality of pixels of said image contained therein and each of said second plurality of rows having previously added pixels therein, said method comprising:

(a) removing said second plurality of rows from each of said plurality of columns;

(b) storing said first plurality of rows within a memory; and (c) causing said pixels within the same row of said first plurality of rows, associated with each of said columns, to be output from said memory.

* * * * *